(12) United States Patent
Steege et al.

(10) Patent No.: US 10,137,944 B2
(45) Date of Patent: Nov. 27, 2018

(54) REFUSE COLLECTION VEHICLE BODY WITH PENDULUM PACKER

(71) Applicant: Wayne Industrial Holdings, LLC, Cedar Falls, IA (US)

(72) Inventors: Dean S Steege, Cedar Falls, IA (US); Curtis J Lellig, Independence, IA (US); Douglas A Halbur, Glidden, IA (US)

(73) Assignee: Curbtender, Inc., Cedar Falls, IA (US)

( * ) Notice: Subject to any disclaimer, the term of this patent is extended or adjusted under 35 U.S.C. 154(b) by 69 days.

(21) Appl. No.: 15/586,893

(22) Filed: May 4, 2017

(65) Prior Publication Data
US 2017/0233185 A1    Aug. 17, 2017

Related U.S. Application Data

(62) Division of application No. 14/834,611, filed on Aug. 25, 2015, now Pat. No. 9,764,894.

(51) Int. Cl.
*B62D 33/037* (2006.01)
*B62D 33/027* (2006.01)
*B62D 33/04* (2006.01)
*B65D 90/08* (2006.01)
*B65F 3/00* (2006.01)
*B65F 3/20* (2006.01)
*B65F 3/26* (2006.01)

(52) U.S. Cl.
CPC ....... *B62D 33/0273* (2013.01); *B62D 33/037* (2013.01); *B62D 33/042* (2013.01);
(Continued)

(58) Field of Classification Search
CPC ............ B62D 33/0273; B62D 33/0276; B62D 33/037; B60Y 2200/144; E05D 15/00;
(Continued)

(56) References Cited

U.S. PATENT DOCUMENTS 3,202,456 A * 8/1965 Cadotte ................. B65F 3/00
                                                                296/101
3,990,739 A * 11/1976 Head ..................... B60J 5/108
                                                                296/56
(Continued)

FOREIGN PATENT DOCUMENTS

CA        2386021        10/2003
GB        2409232 A  *   6/2005   ............... B60P 1/26

OTHER PUBLICATIONS

Eaton Lifesense Hydraulic Hose Condition Monitoring, http://www.eaton.com/Eaton/ProductsServices/Hydraulics/HoseHoseFittings/PCT_270012, Jul. 10, 2015.

*Primary Examiner* — Dennis H Pedder
(74) *Attorney, Agent, or Firm* — Husch Blackwell LLP

(57) ABSTRACT

A refuse collection vehicle body having a receiving hopper with a pendulum packer device mounted for arcuate movement therewithin, a tapered storage compartment for receiving refuse material from the receiving hopper, a tailgate assembly having a pneumatic mechanism for controlling the tailgate latch mechanism, and an ejection system for dumping the refuse material collected within the storage compartment, the storage compartment having a trough or channel associated with its top portion for housing the hydraulic cylinders associated with the pendulum packer device and the tailgate assembly. The hydraulic cylinder associated with the ejection system as well as the hydraulic tank and hydraulic fluid cooler associated with the vehicle body are all positioned over hazmat containment devices to contain any leakage from these components during normal operation. The tapered storage compartment is formed by joining two rectangular sheets of material to a pair of wedge shaped members.

6 Claims, 23 Drawing Sheets

(52) U.S. Cl.
CPC ............... *B65D 90/08* (2013.01); *B65F 3/00* (2013.01); *B65F 3/205* (2013.01); *B65F 3/208* (2013.01); *B65F 3/26* (2013.01); *B60Y 2200/144* (2013.01); *B65F 2003/006* (2013.01)

(58) Field of Classification Search
CPC ........... E05D 15/46; E05D 1/004; E05D 1/12; E05C 3/00; E05C 3/04; E05C 3/08; E05C 3/162
USPC .......................................................... 296/56
See application file for complete search history.

(56) References Cited

U.S. PATENT DOCUMENTS

| | | | | |
|---|---|---|---|---|
| 4,307,541 | A | * | 12/1981 | Farmer ................ B62D 33/037 296/56 |
| 4,775,283 | A | * | 10/1988 | Krapp ...................... B65F 3/28 296/101 |
| 4,877,366 | A | | 10/1989 | De Filippi |
| 5,143,496 | A | * | 9/1992 | Smith ...................... B60P 1/26 296/35.3 |
| 5,324,161 | A | | 6/1994 | Thobe |
| 5,498,067 | A | * | 3/1996 | Christenson ............. B65F 3/00 298/23 MD |
| 6,012,892 | A | * | 1/2000 | Stragier ................... B65F 3/00 100/270 |
| 6,030,019 | A | * | 2/2000 | Stiltner ................ B62D 33/037 292/39 |
| 6,854,949 | B2 | | 2/2005 | Huang |
| 2011/0233953 | A1 | * | 9/2011 | Dunker ................... B60P 1/26 296/56 |

* cited by examiner

REFUSE COLLECTION VEHICLE BODY WITH PENDULUM PACKER

CROSS REFERENCE

This application is a divisional of U.S. Utility application Ser. No. 14/834,611, filed Aug. 25, 2015, all of which is hereby incorporated by reference.

BACKGROUND OF INVENTION

The present invention relates generally to a refuse collection vehicle body and, more particularly, to a refuse collection vehicle body having hazmat containment means associated therewith as well as an improved tailgate locking mechanism, a flared storage compartment body design and an electrical monitoring system for the monitoring of hoses associated with the hydraulic cylinders incorporated into the refuse collection vehicle body.

Various types of refuse collection systems in vehicles are well-known in the industry. Such refuse collection vehicles typically include a refuse collection vehicle body positioned on a vehicle chassis where the vehicle chassis includes a cab or operator compartment for housing the vehicle operator, a frame structure for holding the refuse collection vehicle body including an appropriate number of wheels for carrying the designed load, and an engine for powering the vehicle and the hydraulic and/or pneumatic systems associated therewith.

The refuse collection vehicle body typically includes a receiving hopper, a storage compartment and a mechanism for emptying the refuse material collected within the storage compartment. The receiving hopper is typically located forward of the storage compartment and is designed to receive the refuse material when loaded within the vehicle body. A wall or partition member typically separates the receiving hopper from the storage compartment. The storage compartment typically includes a rectangular straight body design and a rear access door for allowing egress of the stored refuse or waste material. The partition or wall member separating the receiving hopper from the storage compartment typically includes a passageway for allowing the refuse material from the receiving hopper to be transferred to the storage compartment.

Transfer of the refuse material from the receiving hopper to the storage compartment can be accomplished in several different ways. One mechanism includes a longitudinal sliding packer device which moves the refuse from a front portion of the receiving hopper through the opening associated with the divider wall member into the storage compartment. Another mechanism typically used is a pendulum style packer mechanism wherein the packer device is pivotally mounted within the receiving hopper and swings in an arcuate fashion from a raised position to a position adjacent the opening in the divider wall so as to again transfer the refuse material from the receiving hopper through the divider wall opening into the storage compartment. In this type of mechanism, the receiving hopper floor is typically arcuate in shape to correspond to the arc of the pendulum style packer device. The pendulum style packer is typically operated through the use of a pair of hydraulic cylinders which typically extend into either the receiving hopper or the storage compartment. In either case, these hydraulic cylinders are exposed to the refuse material being collected.

To empty waste from the storage compartment, a typical refuse collection vehicle body will include a pivotally mounted tailgate associated with the rear portion of the storage compartment which is moved to an open position to permit transfer of the stored refuse material from the storage compartment to a landfill site or other location. Typically, the tailgate is activated by a pair of hydraulic lift cylinders to open and close the tailgate. The refuse material can be egressed from the storage compartment through conventional ejection systems such as through the use of a vehicle body tilting mechanism, or through the use of a sliding packer device which engages the divider wall or partition member between the receiving hopper and the storage compartment and longitudinally slides that divider wall towards the rear of the vehicle.

All of the known refuse collection vehicles utilize hydraulic cylinders for many operations associated with the refuse collection vehicle including opening and closing of the tailgate, movement of the respective packing devices, raising and lowering the vehicle body when a tilting ejection mechanism is utilized and, moving the divider wall when a sliding packer ejection mechanism is utilized, and other operations associated with a typical refuse collection vehicle. Such vehicles likewise utilize hydraulic fluid coolers, hydraulic tanks and a plurality of hydraulic lines to likewise operate the various hydraulic cylinders and other mechanisms associated with a typical refuse collection vehicle. These hydraulic cylinders and other components are typically exposed to the environment such that if a leak occurs in any of the hydraulic lines and hoses associated with these mechanisms, such hydraulic fluid or other hazardous material will be exposed to the environment. In other words, such fluid would leak onto roads, driveways, parking lots and other surfaces external to the refuse collection vehicle. A mechanism for containing these fluids if a leak or other malfunction should occur as well as a mechanism for monitoring these systems for possible degradation of the hoses and lines associated therewith or failure of such systems is greatly needed. In addition, the vehicle body configuration which removes the pendulum style packing cylinders or the sliding packer ejection system cylinders from inside the receiving hopper or storage compartment would greatly improve the longevity and wear and tear on these cylinders.

The present invention seeks to overcome the shortcomings and disadvantages associated with the known refuse collection vehicles by relocating and reducing the number of hydraulic cylinders associated with the operation of a refuse collection vehicle and by providing a hazmat containment system for all such hydraulic cylinders, hydraulic tank, hydraulic fluid cooler and associated hydraulic lines and hoses. The present invention also provides an electrical monitoring system for monitoring the hoses associated with the various hydraulic cylinders so as to give the vehicle operator advance notice of a pending failure of any of such hoses before a hazmat situation occurs.

Other improvements include several embodiments of an improved tailgate locking mechanism which incorporates a pneumatic system for applying air pressure to the tailgate latch mechanism when in its closed and lock position to further eliminate a potential hydraulic leak in this area if hydraulic cylinders were used to operate the latching mechanism. In addition, a flared storage compartment body design is utilized to simplify the manufacturing and assembly of the storage compartment and further facilitate and improve the egress of the waste material from within the storage compartment during the ejection or dumping process.

SUMMARY OF INVENTION

According to one aspect of the present invention, there is provided a refuse collection vehicle body having a receiving hopper, a storage compartment, and a pendulum type packer device mounted within the receiving hopper for transferring the refuse material from the receiving hopper to the storage compartment in a conventional manner. The pendulum style packer device is pivotally mounted for arcuate movement within the receiving hopper and is controlled by a single packing hydraulic cylinder mounted above the storage compartment for easy access. The packing cylinder is positioned and located within a trough associated with the top portion of the storage compartment so as to contain any oil or hydraulic leakage associated with the packing cylinder. All hydraulic lines and control box activation units for operating the packing cylinder are likewise positioned and located within this center trough or are routed through hollow structural members for hazmat containment purposes.

The pendulum style packer device operates in a conventional manner in that it is operable to arcuately swing from a first elevated position to a second lower position adjacent an opening associated with a divider wall or partition which separates the receiving hopper from the storage compartment. The packing device has a head portion which will engage the refuse material deposited within the receiving hopper and move such material through the opening associated with the divider wall and into the storage compartment. When in its second position, the pendulum packer head portion lies adjacent to or within the opening associated with the divider wall.

According to another aspect of the present invention, all of the hydraulic cylinders associated with the present refuse collection vehicle body including the hydraulic tank, the hydraulic fluid cooler, and all hydraulic lines associated with the vehicle are either located in a trough, positioned above a drip pan, positioned within a hollow structural member, or are encased in an impermeable sleeve or other hazmat containment device so as to contain any leakage from any of these cylinders, tanks, coolers, hydraulic lines or other components housing hydraulic fluid or other hazardous materials. These hazmat containment devices are strategically located such that if an leakage occurs, all such leakage will be contained within the associated hazmat containment device and such hazardous fluid material will not be directly exposed to the environment.

Still further, according to another aspect of the present invention, an electrical monitoring system is associated with at least some of the hydraulic hoses utilized in the present refuse collection vehicle body. In this regard, each of the hydraulic hoses utilized in the present system utilizing the monitoring system have electrical connections which allow such hoses to be connected to a computer or system controller for monitoring the degradation and pending failure of all such hoses. This monitoring information is displayed to the vehicle operator in the cab of the vehicle and functions as a preventive maintenance alert to avoid failure or rupture of any hose and the associated leakage of the hazardous fluid that would occur.

Still further, according to another aspect of the present invention, a single hydraulic cylinder operates the tailgate assembly associated with the present refuse collection vehicle body. This single hydraulic cylinder likewise lies in the center trough located above the storage compartment and all of the associated hydraulic lines are likewise located within this center trough or hollow structural members with access holes or panels for easy access. Again, any leakage associated with this single hydraulic cylinder and its associated hydraulic lines are contained within the center trough or within a hollow structural member associated with the vehicle body and are not exposed to the environment.

Several embodiments of an improved air lock latch mechanism are also disclosed in association with the tailgate assembly to prevent any accidental spillage of the refuse material housed within the storage compartment and to likewise reduce the number of hydraulic cylinders associated with the present vehicle since typically a hydraulic cylinder would be associated with the tailgate latching mechanisms. These air lock latch mechanisms include a pin and hook arrangement wherein the hook engages the pin when the tailgate is in its closed position or a double sliding latch pin arrangement where a pair of sliding pins engage a pair of latch locking flanges when the tailgate is in its closed position, and a pair of pneumatic air bags control the air pressure for moving the hook and latch pins into and out of engagement with its associated latch locking member.

According to yet another aspect of the present invention, the storage compartment is formed in a flared or tapered configuration, the back portion of the storage compartment adjacent the tailgate being wider than the front portion of the compartment adjacent the divider wall that separates the receiving hopper from the storage compartment. This flared configuration is made by joining two rectangular sheets of material forming the respective side, top and bottom portions of the storage compartment to a pair of wedge shaped members, one wedge shaped member being associated with the bottom portion of the storage compartment and the other wedge shaped member being associated with the top of the storage compartment. These wedge shaped members impart the flared or tapered configuration to the storage compartment and the top wedge shaped member forms the center trough for holding and containing the pendulum packing cylinder and the tailgate lift cylinder and at least some of their respective associated hydraulic lines and control box units. This flared configuration improves the dumping efficiency of the present refuse collection vehicle body and likewise improves and simplifies the manufacturing and construction of the storage compartment.

A single vehicle body lift cylinder is centrally located forward of the receiving hopper for raising and lowering the entire vehicle body and for tilting the same to empty the refuse material contained therewithin. Use of a single vehicle body lift cylinder as compared to the conventional usage of two such lift cylinders likewise reduces the total number of hydraulic cylinders associated with the present refuse collection vehicle body thereby again reducing possible hazmat exposure. In addition, all cylinders associated with the present refuse collection vehicle body and their associated hydraulic lines are contained such that if any leakage does occur, such hazardous fluid material will be contained within the refuse collection vehicle body in appropriate drip pans, troughs, hollow structural members, sleeves or other hazmat containment devices such that the hazardous fluid material will not be exposed to the environment.

Additional features of the present invention will be described in the course of the following detailed description.

While the present disclosure is susceptible to various modifications and alternative forms, a specific embodiment of the present invention is shown by way of example in the present drawings and will herein be described in detail. It should be understood, however, that the present drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

Figure 1:
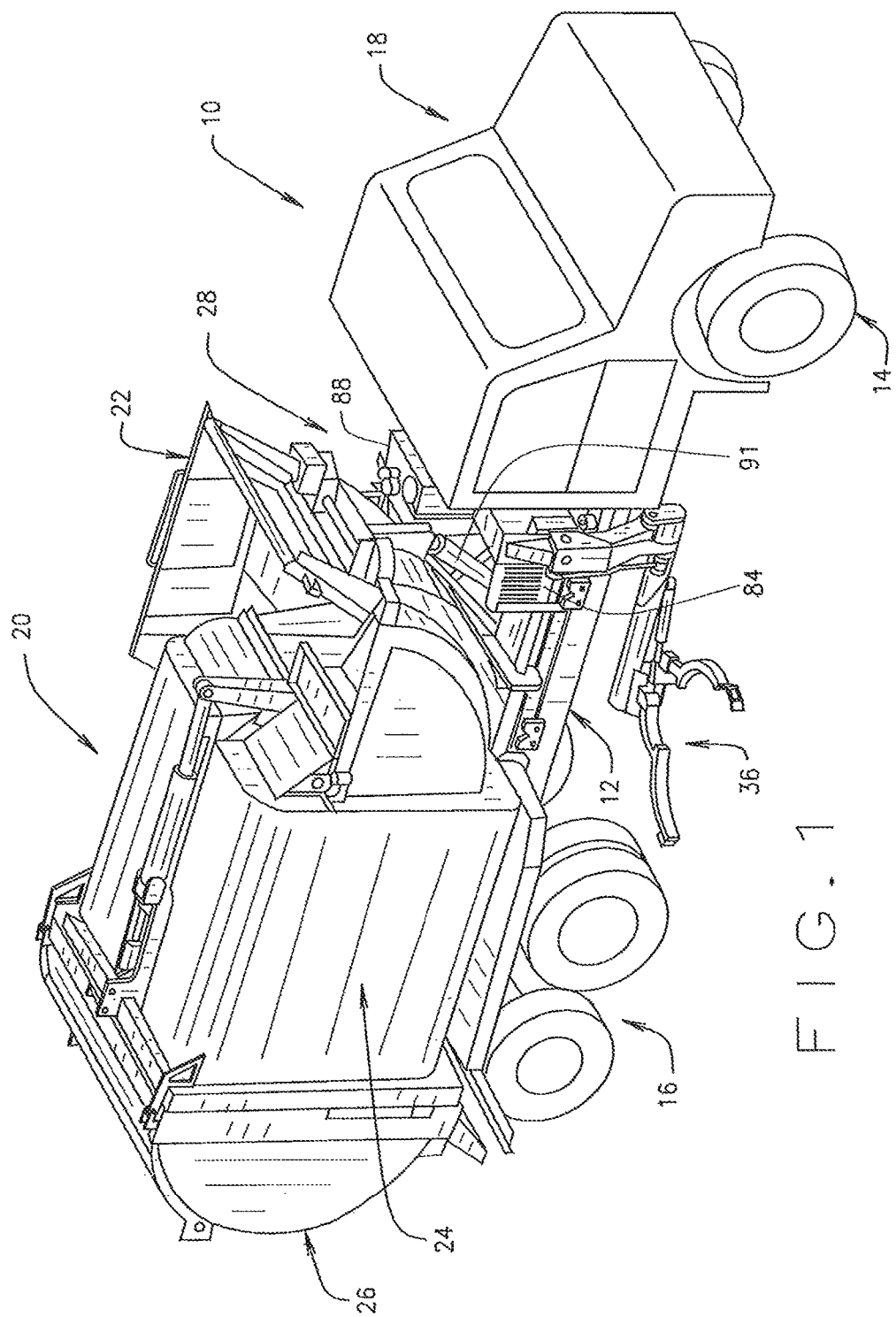
FIG. 1 is a perspective view of a refuse collection vehicle utilizing the refuse collection vehicle body of the present invention.

Referring to the drawings more particularly by reference numbers where in like numerals refer to like parts, numeral 10 in FIG. 1 illustrates a refuse collection vehicle incorporating the improved refuse collection vehicle body 20 of the present application. The refuse collection vehicle 10 includes a chassis frame structure 12 for holding the present refuse collection vehicle body 20, a front set of wheels 14, an appropriate number of sets of rear wheels 16 for carrying the designed load of the vehicle, a cab or operator compartment 18 for housing the vehicle operator and other appropriate control panels for operating the various systems associated with the present vehicle including a system controller and other operational controls, and an engine (not shown) for powering the vehicle and the hydraulic and/or pneumatic systems associated therewith. The present refuse collection vehicle body 20 is mounted to the top of the chassis frame structure 12 in a conventional manner as illustrated in FIG. 1.

Figure 2:
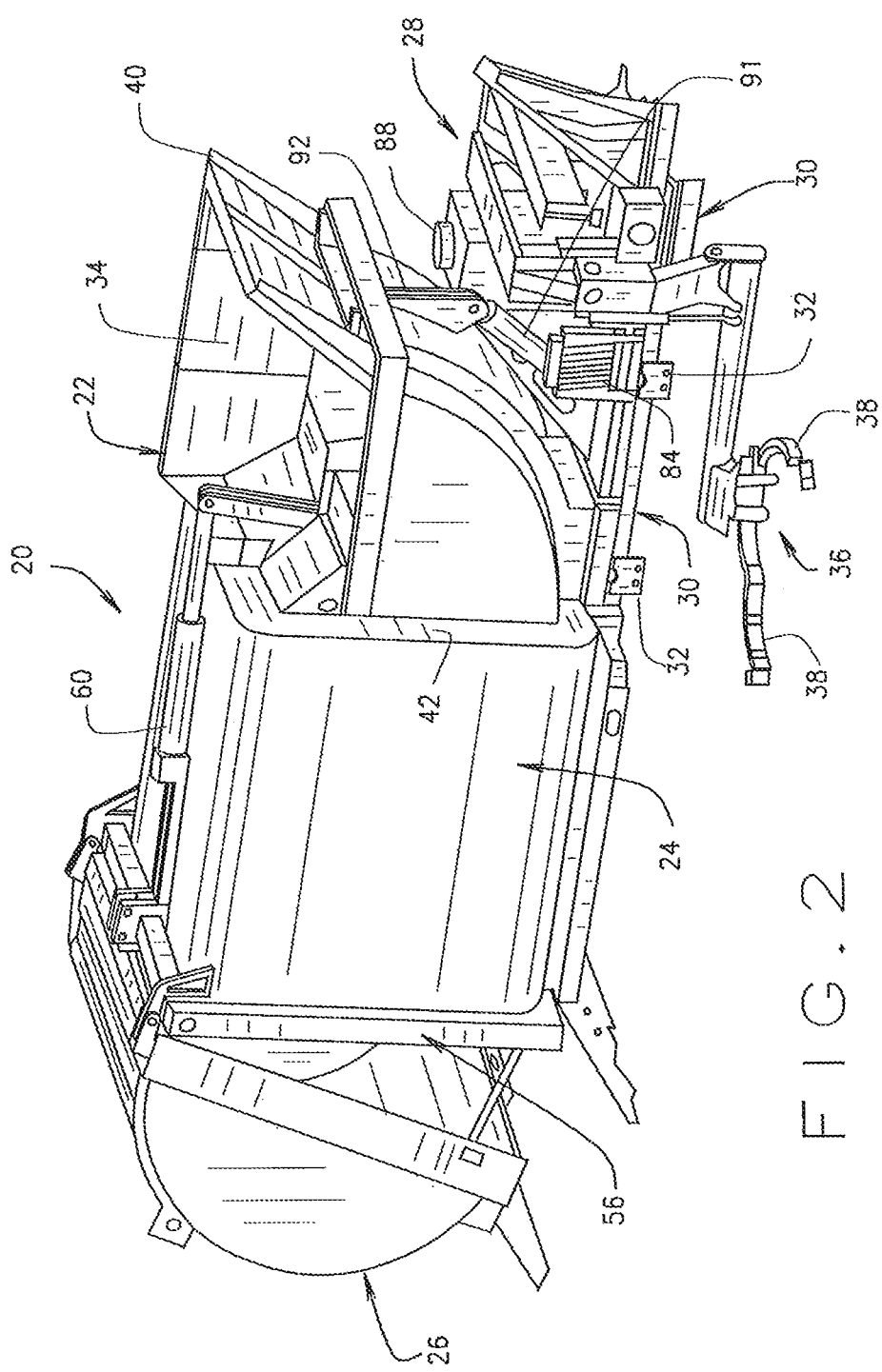
FIG. 2 is a perspective view of the present refuse collection vehicle body constructed in accordance with the teachings of the present invention.

FIGS. 1 and 2 identify one embodiment of the present refuse collection vehicle body 20 constructed according to the teachings of the present invention. In this regard, the refuse collection vehicle body 20 can be constructed so to be compatible for attachment to any suitable chassis frame structure associated with any particular type of refuse collection vehicle such as the frame structure 12 illustrated in FIG. 1. Although a specific refuse collection vehicle body structure 20 will be identified and discussed herein, it is recognized and anticipated that many of the components and systems associated with the present body structure 20 can be fashioned into a variety of different sizes and shapes other than those illustrated herein and that other components associated with the various systems and assemblies of the present body structure 20 may likewise be correspondingly shaped to conform to the chassis structure of any particular refuse collection vehicle without departing from the teachings and practice of the present invention.

Figure 7:
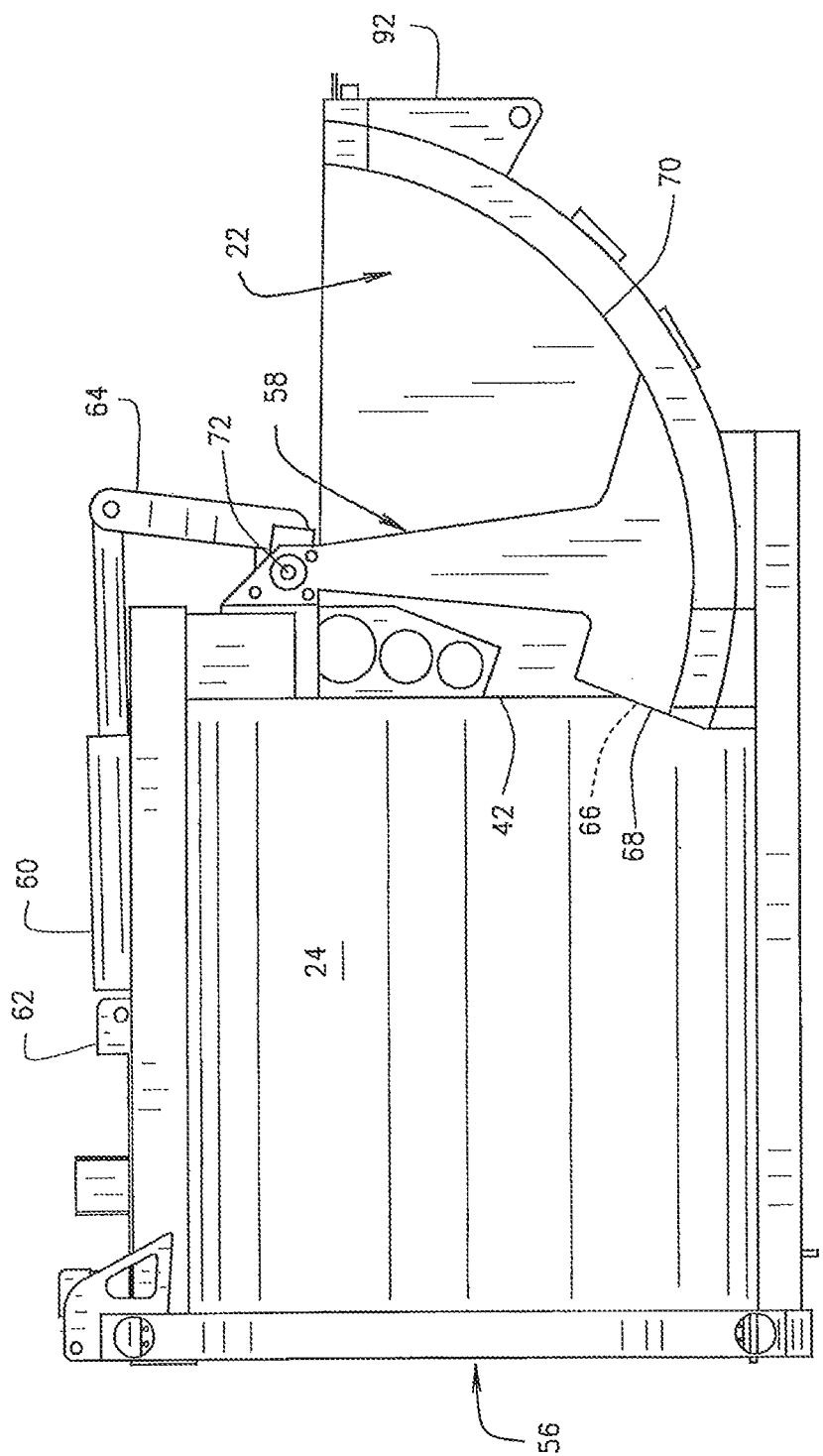
FIG. 7 is a side elevational partial cutaway view of the storage compartment and receiving hopper of the present refuse collection vehicle body showing the pendulum packer device in its second lowered position.

According to one aspect of the present invention, the refuse collection vehicle body 20 includes a receiving hopper 22 for initially receiving refuse material, a storage compartment 24, a pendulum type packer device 58, as best illustrated in FIG. 7, mounted within the receiving hopper 22 for transferring the refuse material from the receiving hopper 22 to the storage compartment 24 in a conventional manner, and a pivotally mounted tailgate assembly 26 associated with the rear portion of the storage compartment 24 for both containing the refuse material within the storage compartment 24 when the tailgate assembly 26 is in its closed position and for allowing egress of the refuse material stored within the storage compartment 24 when the tailgate assembly is in its open position. The receiving hopper 22, the storage compartment 24, and associated systems 28 (FIGS. 1 & 2) as will be hereinafter further explained are positioned and located on a subframe assembly 30 as best illustrated in FIG. 2, the subframe assembly 30 being easily attachable to the vehicle chassis frame structure 12 in a conventional manner such as through the use of attachment brackets 32 and other joinder means. Once all of the components of the present refuse collection vehicle body 20 are assembled on subframe structure 30, the entire refuse collection vehicle body 20 is then attachable to any particular refuse collection vehicle chassis frame structure such as the frame structure 12 illustrated in FIG. 1.

The receiving hopper 22 includes an open top portion 34 through which refuse material may be deposited by an automated container loading mechanism 36 illustrated in FIGS. 1 & 2. The automated container loader mechanism 36 is well-known in the art and includes arm members 38 for grasping and holding a trash container. When activated, the container loader mechanism 36 will lift a trash container and pivot the same for dumping into the open top portion 34 of receiving hopper 22. The container holding mechanism 36 may be hydraulically or pneumatically operated and may include appropriate hydraulic cylinders or pneumatic activating cylinders for lifting, dumping and returning a trash container to its curbside position. The receiving hopper 22 may also include one or more side openings (not shown) associated with the side wall structure of the receiving hopper 22 for allowing manual loading of refuse material into the receiving hopper. The receiving hopper 22 may also include a selectively movable lid or cover member 40 for opening and closing access to the receiving hopper 22. The movable lid or cover member 40 may be manually movable between an open and closed position, or it can be movable through the use of hydraulic or pneumatic actuators. The cover 40 can also serve as a pre-crush panel to preliminarily compact the refuse material within the receiving hopper 22 when the cover 40 is in its closed position.

Figure 3:
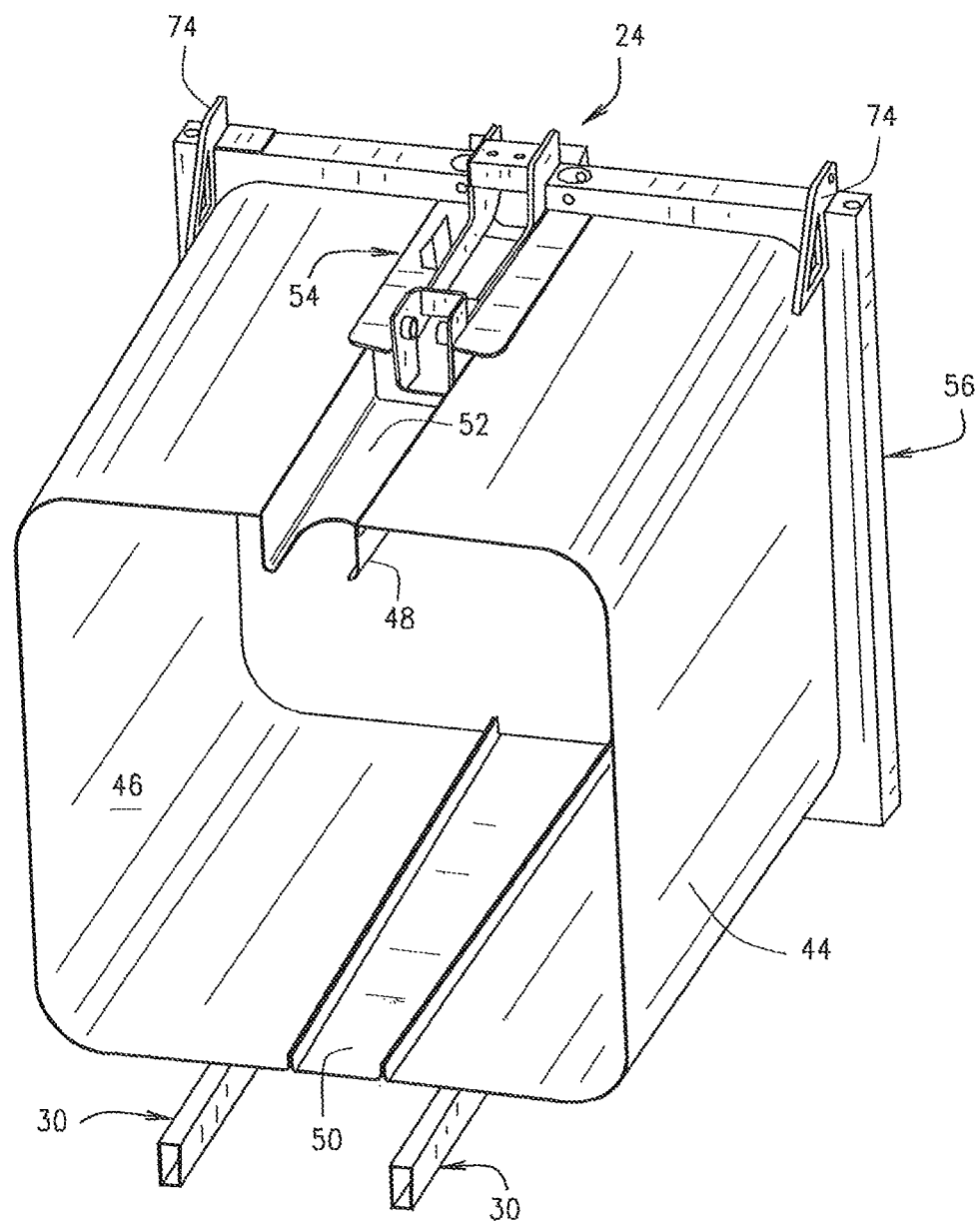
FIG. 3 is a perspective view of the storage compartment of the present refuse collection vehicle body constructed in accordance with the teachings of the present invention.
Figure 4:
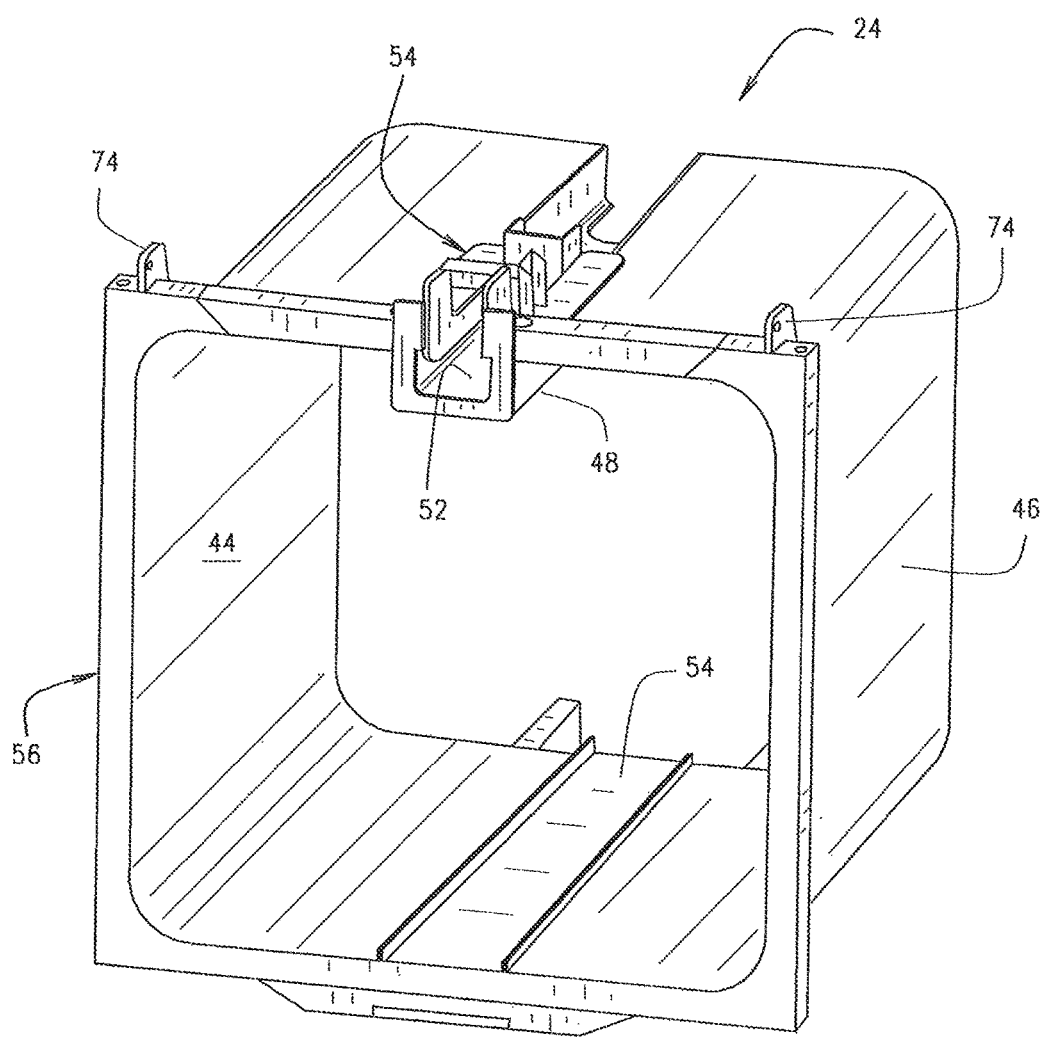
FIG. 4 is another perspective view of the storage compartment of FIG. 3 looking in the opposite direction of FIG. 3.

FIGS. 3-6 illustrate one embodiment of the present storage compartment 24 constructed according to the teachings of the present invention. More particularly, FIGS. 3 and 4 illustrate perspective views of the storage compartment 24 detailing the construction and assembly of compartment 24 looking both from the receiving hopper 22 into storage compartment 24 (FIG. 3) and looking from the tailgate assembly 26 into storage compartment 24 (FIG. 4). The storage compartment 24 is formed in a flared or tapered configuration as best seen in FIG. 3, the rear portion of the storage compartment 24 adjacent the tailgate assembly 26 being wider than the forward portion of the compartment adjacent a divider wall 42 (FIGS. 2 & 7) that separates the receiving hopper 22 from the storage compartment 24. This flared configuration is achieved by joining two rectangular sheets of material 44 and 46 to a pair of wedge shaped members 48 and 50 as best illustrated in FIGS. 3 and 4, wedge shaped member 48 being associated with the top portion of the storage compartment 24 and the wedge shaped member 50 being associated with the bottom portion of the storage compartment 24.

The wedge shaped members 48 and 50 impart the flared or tapered configuration to the overall storage compartment as will be hereinafter explained. The rectangular sheets of material 44 and 46 form the respective opposed side wall portions as well as the top and bottom portions of the storage compartment when such members are attached to the wedge shaped members 48 and 50. This is accomplished by initially folding the sheet members 44 and 46 to the side wall portions associated with the wedge shaped members 48 and 50, which process allows for precise alignment of the four members which comprise the totality of the storage compartment 24. Once this is accomplished, the interface between the sheet members 44 and 46 and the wedge shaped members 48 and 50 are welded together to complete the overall assembly. This design is very easily made and takes much less welding as compared to other methods for generating a flared or tapered body design. Typically a conventional flared body is constructed of two or three or even four consecutively larger panels that must be formed with a roller mechanism and thereafter welded together at all of the adjoining seams. In this conventional construction, it is problematic to fixture this type of arrangement as there are wide tolerances of manufacturing associated with such construction. Use of the present design which includes only four members as described above greatly simplifies both the construction of the four individual members as well as the assembly of such members in order to achieve the flared body configuration of storage compartment 24.

In addition, it is well known that when the refuse material has been compressed within the storage compartment and you are thereafter attempting to excavate the refuse material by gravity dumping the same, the refuse material tends to stay in the body. This flared configuration allows the trash to decompress as it exits the storage compartment as the refuse material is moving from a narrower space into a larger space as it moves from the divider wall 42 towards the tailgate assembly 26 during a dumping operation as will be hereinafter further explained.

The wedge shaped member 48 located at the top of storage compartment 24 is substantially U-shaped in configuration as best illustrated in FIGS. 3 and 4 forming a channel or trough 52 which is used for holding and containing the pendulum packing hydraulic cylinder 60, the tailgate hydraulic cylinder 76 and most of the associated hydraulic lines and control block units associated therewith as will be hereinafter further explained. The trough 52 is dimensioned to receive the above-referenced hydraulic cylinders and associated plumbing and likewise forms a containment trough for such cylinders and associated hydraulic lines in the event of any leakage as will be hereinafter further explained. The wedge shaped member 48 includes appropriate support structure 54 for holding and fixing the respective hydraulic cylinders and the associated hydraulic lines and control box units necessary for operation of such cylinders. In addition, the rear portion of the storage compartment 24 includes support frame structure 56 for pivotally mounting and supporting the tailgate mechanism 26. Once assembled, the entire storage compartment 24 is fixedly mounted to the subframe assembly 30 as best illustrated in FIG. 3.

Figure 5:
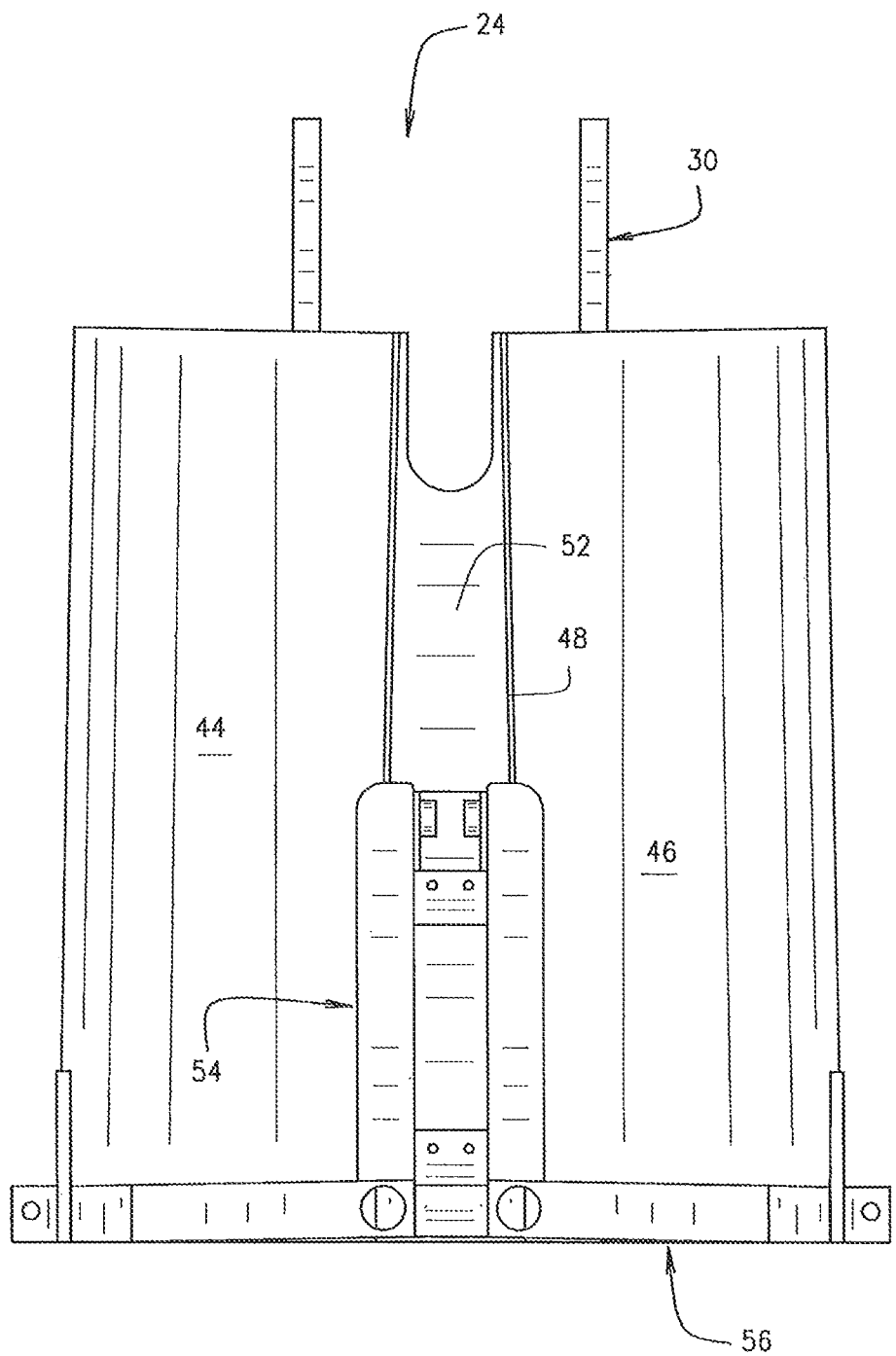
FIG. 5 is a top plan form view of the storage compartment of FIGS. 3 and 4.

FIG. 5 is a top plan form view of the storage compartment 24 showing the trough or channel 52 formed by the upper wedge shaped member 48 as well as the channel support structure 54 and the top view of the tailgate frame structure 56. The flared configuration of storage member 24 is likewise clearly discernible from viewing FIG. 5, the storage compartment 24 being wider at tailgate frame structure 56 as compared to its opposite end portion.

Figure 6:
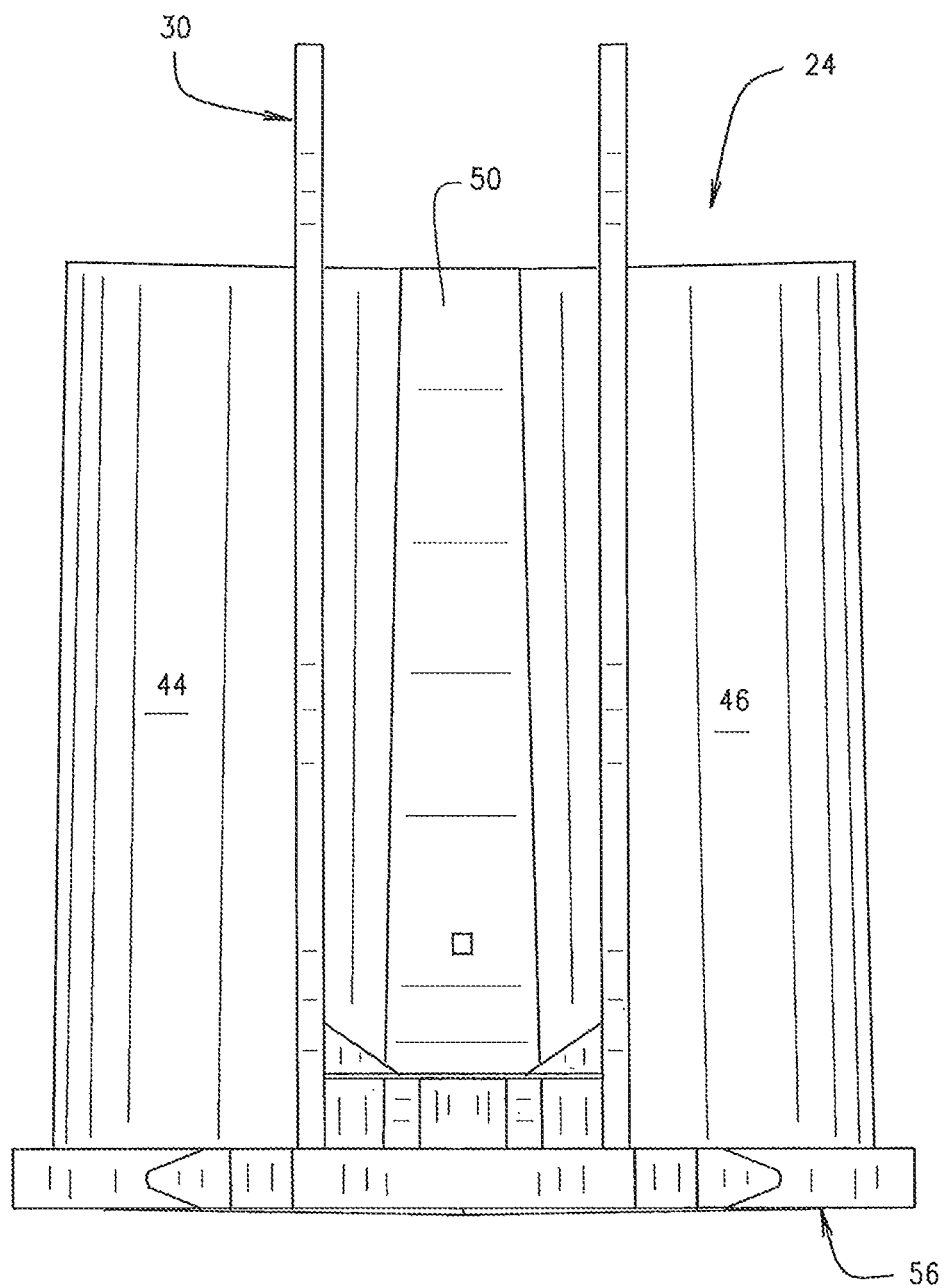
FIG. 6 is a bottom plan form view of the storage compartment of FIGS. 3 and 4.

FIG. 6 is a bottom plan form view of storage compartment 24 showing the bottom wedge shaped member 50 and attachment of the subframe assembly 30 to the bottom portion of storage compartment 24. As will be hereinafter further explained, the flared or tapered configuration of storage compartment 24 improves the dumping efficiency of the present refuse collection vehicle body 20.

Figure 8:
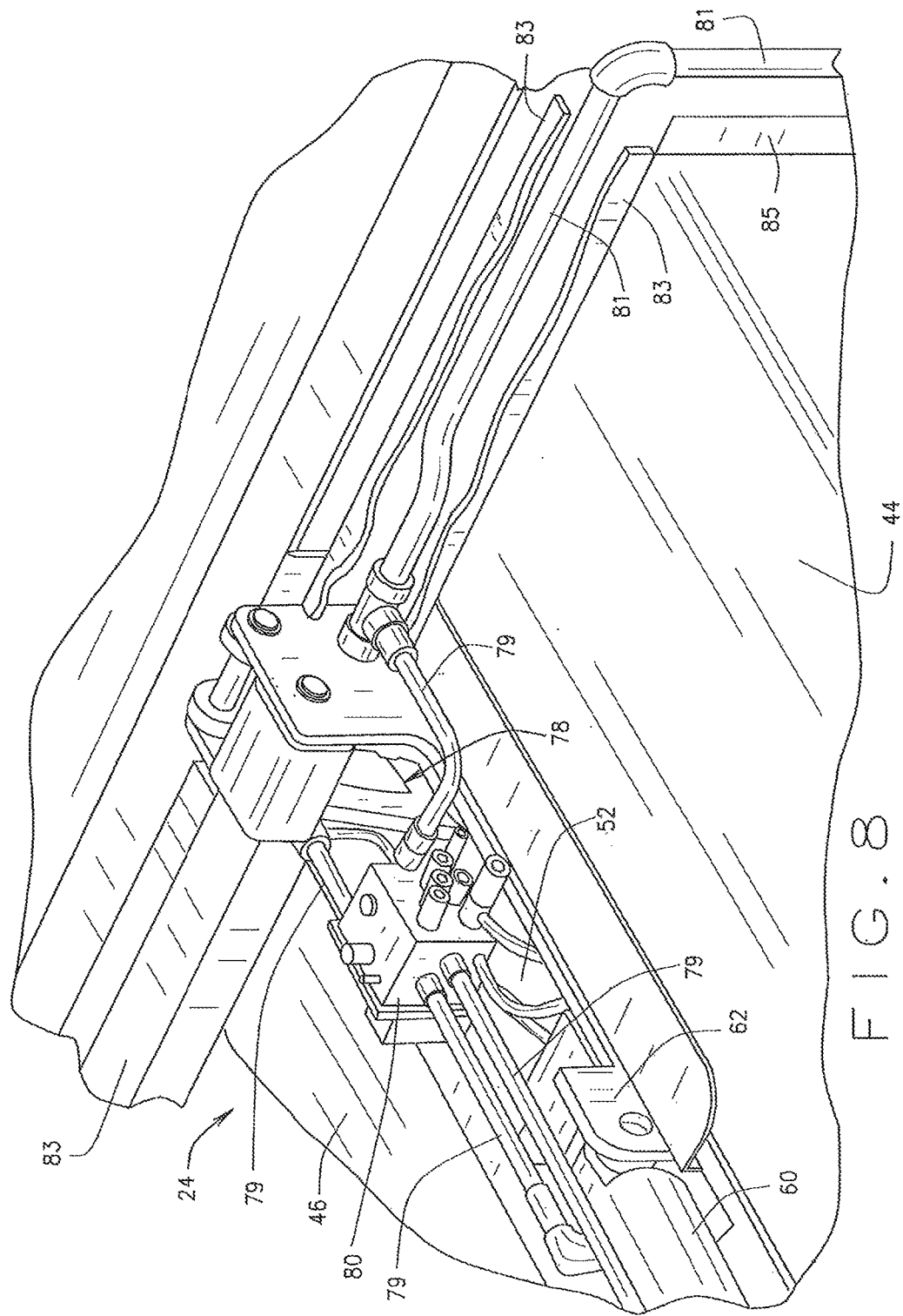
FIG. 8 is a partial perspective view of the top portion of the storage compartment showing a portion of the packing hydraulic cylinder and its associated hydraulic lines and control box unit positioned within the trough formed by the upper wedge shaped member and also showing a partial cut-away view of a hollow structural member associated with the top portion of the storage compartment housing additional hydraulic lines.

FIG. 7 is a side elevational view of the receiving hopper 22 attached to the storage compartment 24. A pendulum type packer device 58 is mounted within the receiving hopper for transferring the refuse material from the receiving hopper 22 to the storage compartment 24 in a conventional manner. The pendulum packer device 58 is pivotally mounted for arcuate movement within the receiving hopper 22 and is controlled by a single packing hydraulic cylinder 60 which is mounted above the storage compartment 24 within the trough 52 formed by the upper wedge shaped member 48. The hydraulic cylinder 60 has one end portion attached to bracket structure 62 as best illustrated in FIGS. 7 and 8 and has its opposite end portion attached to linkage member 64 (FIG. 7) which is likewise attached to packing device 58 for arcuately swinging packer device 58 in a conventional manner between a first elevated position (not shown) and a second lower position adjacent an opening 66 associated with divider wall 42 which separates the receiving hopper 22 from the storage compartment 24. The packing device 58 includes a head portion 68 which will engage the refuse material deposited within the receiving hopper 22 and moves such material through the opening 66 and into the storage compartment 24. When in its second lower position as illustrated in FIG. 7, the pendulum packer head portion 68 lies adjacent to or within the opening 66 associated with divider wall 42. The pendulum style packer device 58 operates in a conventional manner and arcuately swings from its first elevated position to its second lower position adjacent opening 66. Because of the arcuate swing of packer device 58, the floor portion 70 of receiving hopper 22 is typically arcuate in shape to correspond to the arc of the pendulum style packer device 58. Importantly, since the hydraulic cylinder 60 which operates the packer device 58 is located above storage compartment 24, cylinder 60 is not exposed to any refuse material collected within receiving hopper 22, which is typically the case in the known refuse collection vehicles. By positioning cylinder 60 outside of receiving hopper 22, there is less wear and tear and potential damage to cylinder 60 as no refuse material is dumped onto cylinder 60 nor is cylinder 60 exposed to and/or does it travel through the refuse material during operation.

This greatly extends the longevity of the packing cylinder 60 as compared to the known conventional packing hydraulic cylinder arrangements. The pendulum style packer device 58 is pivotally attached to the vehicle body 20 as illustrated in FIG. 7 in a conventional manner. To operate the packing device 58, the hydraulic cylinder 60 is extended causing the packer device 58 to arcuately swing downwardly towards divider wall 42 and opening 66 in a conventional manner thereby transferring the refuse material resting on the hopper floor 70 into storage compartment 24 through the opening 66. Retraction of the cylinder 60 causes the pendulum packer device 58 to swing in the opposite direction towards its first elevated position (not shown) thereby allowing the receiving hopper 22 to receive its next deposit of refuse material. The arcuate floor 70 of receiving hopper 22 is positioned and oriented so as to form a direct path for pushing the refuse material to the opening 66. The pendulum packer device 58 is mounted for movement about a pivot axis 72 which extends generally horizontally as shown in FIG. 7. In addition, mounting the packing cylinder 60 above the storage compartment 24 likewise provides easy access to the cylinder for routine maintenance and repairs.

It is recognized that divider wall 42 may be a separate member formed between the receiving hopper 22 and the storage compartment 24, or divider member 42 may be associated with one end portion of the receiving hopper 22 or with one end portion of the storage compartment 24.

Figure 13:
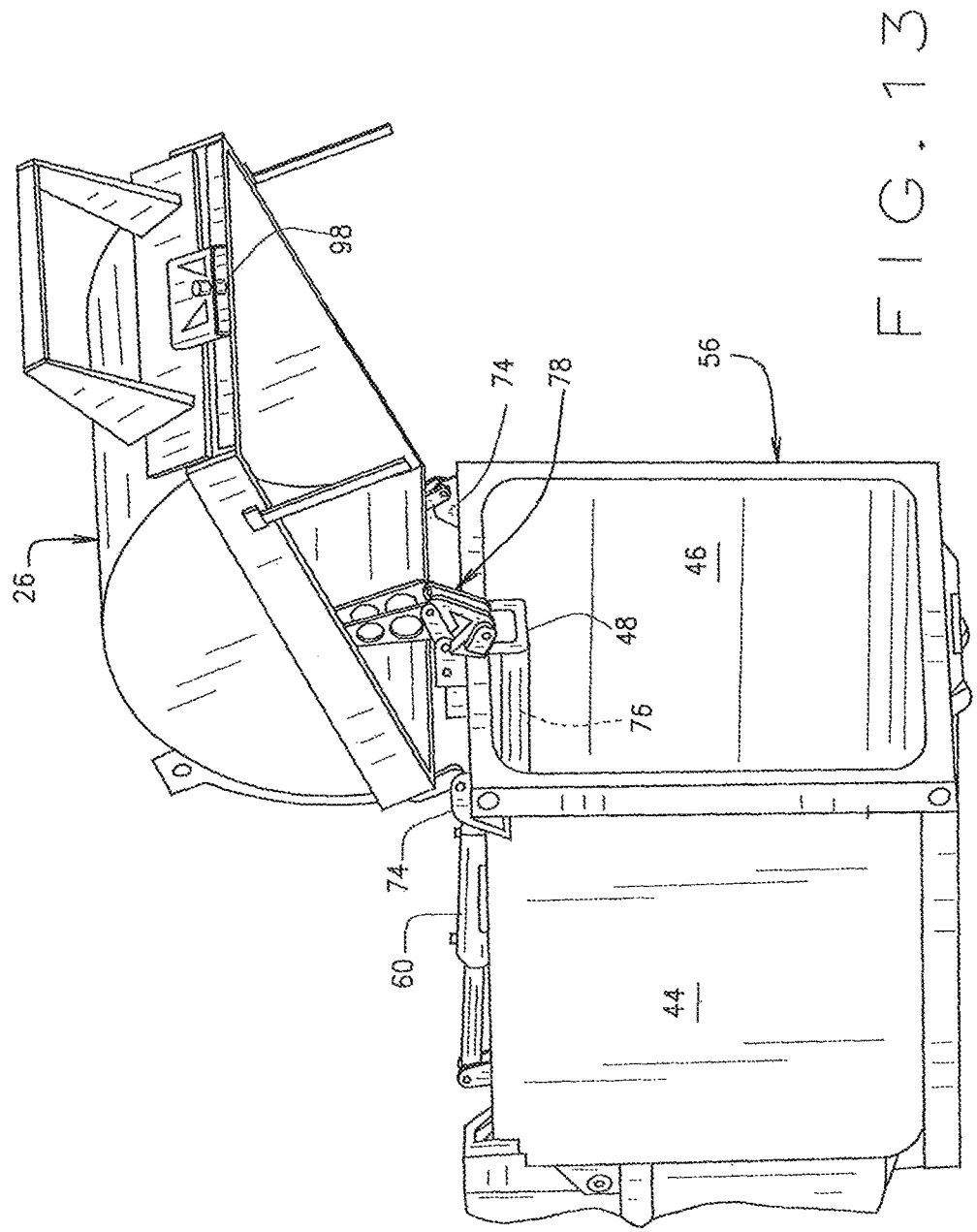
FIG. 13 is a partial perspective view showing the tailgate assembly and its associated linkage assembly in its fully open position.
Figure 14:
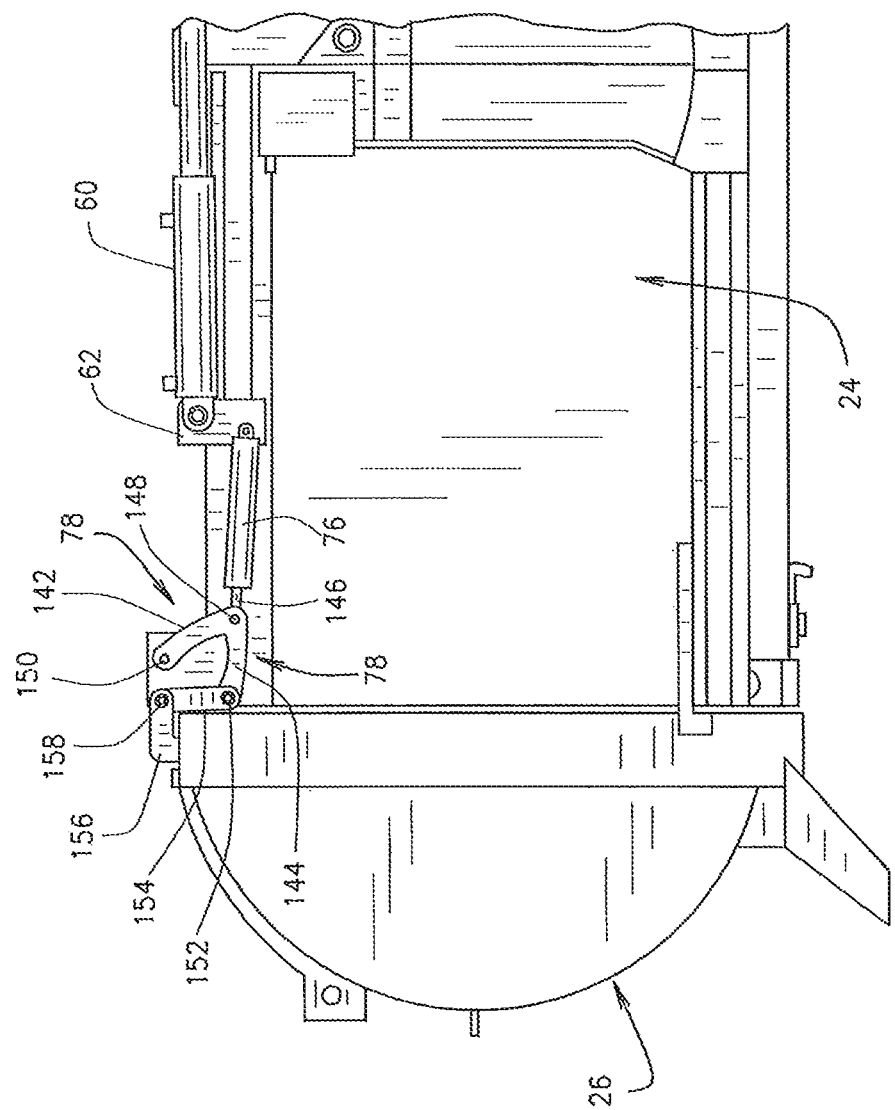
FIG. 14 is a partial side elevational view of the storage compartment and tailgate assembly showing the tailgate hydraulic cylinder and its associated linkage assembly in its fully closed position.
Figure 15:
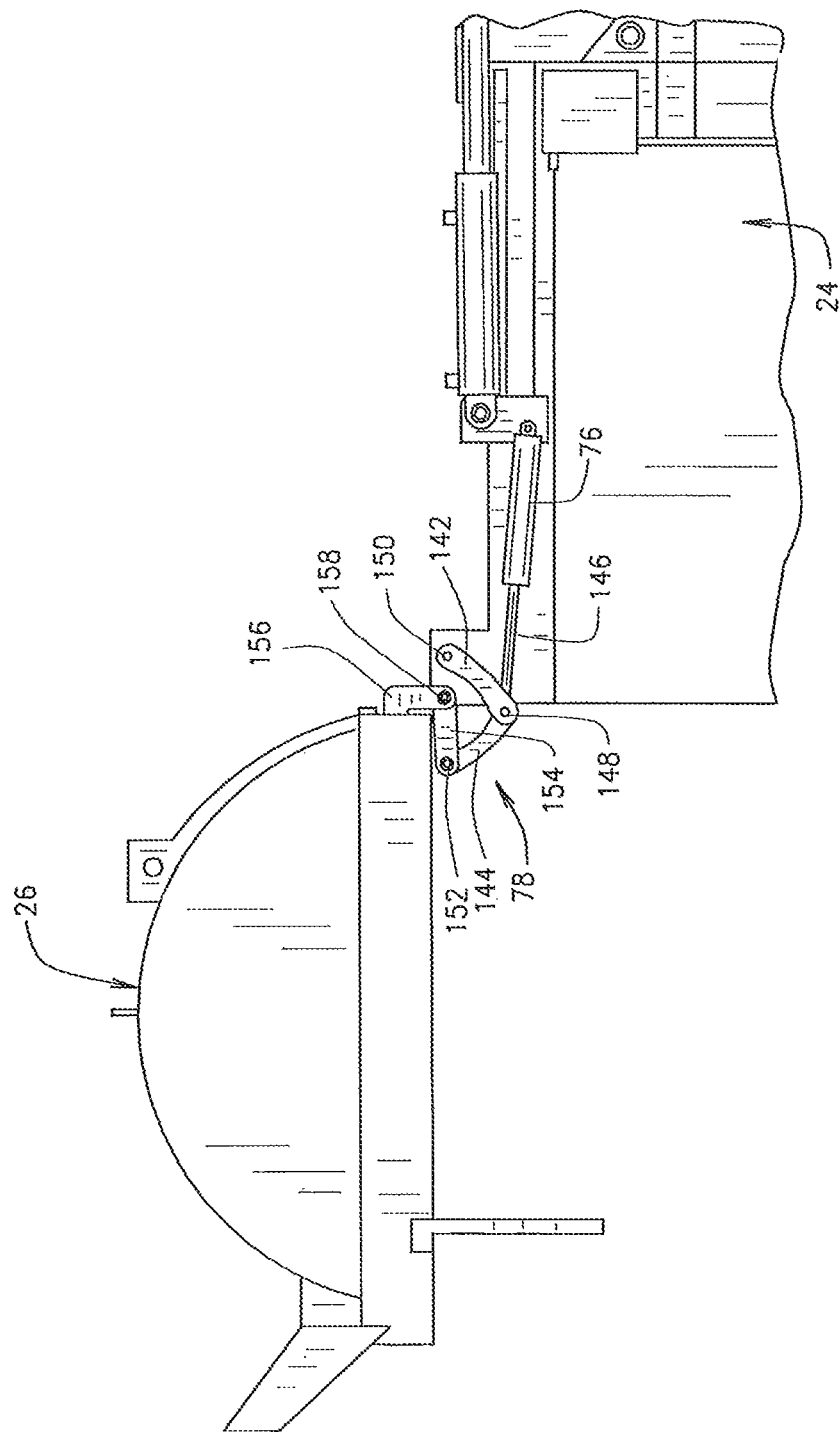
FIG. 15 is a partial side elevational view similar to FIG. 14 showing the tailgate assembly, the tailgate hydraulic cylinder and its associated linkage assembly in a partially opened position.
Figure 16:
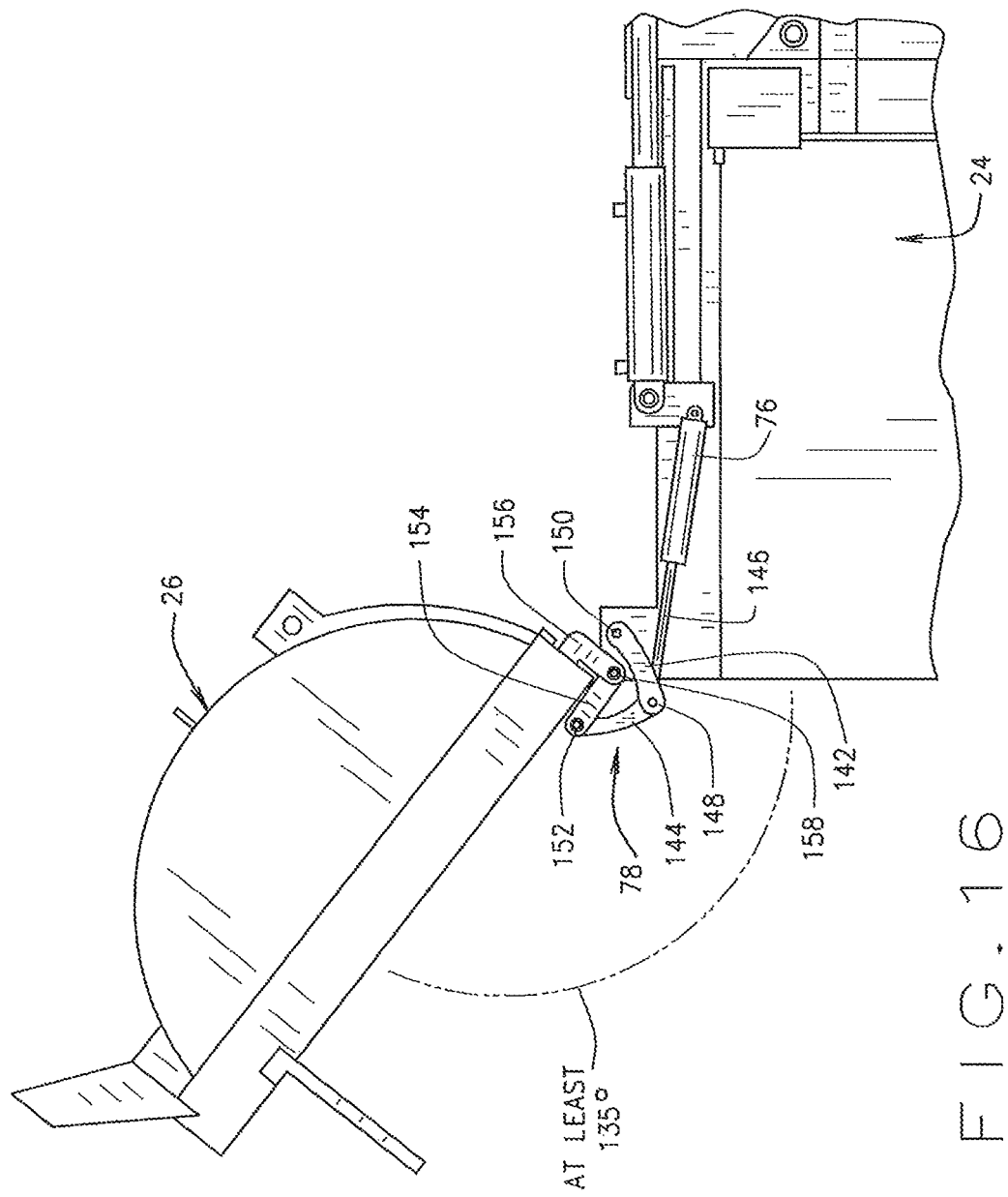
FIG. 16 is a partial side elevational view similar to FIG. 15 showing the tailgate assembly, the tailgate hydraulic cylinder and its associated linkage assembly in its fully opened position.

As best illustrated in FIG. 13, tailgate assembly 26 is pivotally mounted to the tailgate frame structure 56 in a conventional manner as best illustrated in FIGS. 2 and 13. This pivotal connection can be accomplished through the use of flange members 74 associated with frame structure 56 as best illustrated in FIG. 13. According to another aspect of the present invention, a single hydraulic cylinder 76 is utilized to operate the tailgate assembly 26. As best illustrated in FIGS. 9 and 14-16, this single hydraulic cylinder 76 is likewise positioned and located in the trough 52 of the upper wedge shaped member 48 located above the storage compartment 24 in a manner similar to the pendulum packing cylinder 60. One end portion of hydraulic cylinder 76 is attached to bracket structure 62 in a conventional manner as best illustrated in FIGS. 14-16 and the opposite end portion of cylinder 76 is attached to the linkage assembly 78 as best illustrated in FIGS. 13-16 for pivotally moving the tailgate assembly 26 between its fully open position as illustrated in FIGS. 13 and 16 and a fully closed and locked position as best illustrated in FIGS. 1 and 14. Operation of the tailgate assembly between its fully closed position and its fully open position is best illustrated in FIGS. 14-16 as will be hereinafter explained. When cylinder 76 is fully extended as illustrated in FIGS. 13 and 16, the tailgate assembly 26 is pivotally moved upwardly to its fully open position such that refuse material collected within the storage compartment can be ejected therefrom during a dumping operation as will be likewise hereinafter further explained. Retraction of the cylinder 76 causes the tailgate assembly 26 to pivotally move in the opposite direction thereby pivotally moving the tailgate assembly 26 adjacent the tailgate frame structure 56 for closing and locking the tailgate assembly in its closed position, as illustrated in FIG. 14.

Figure 9:
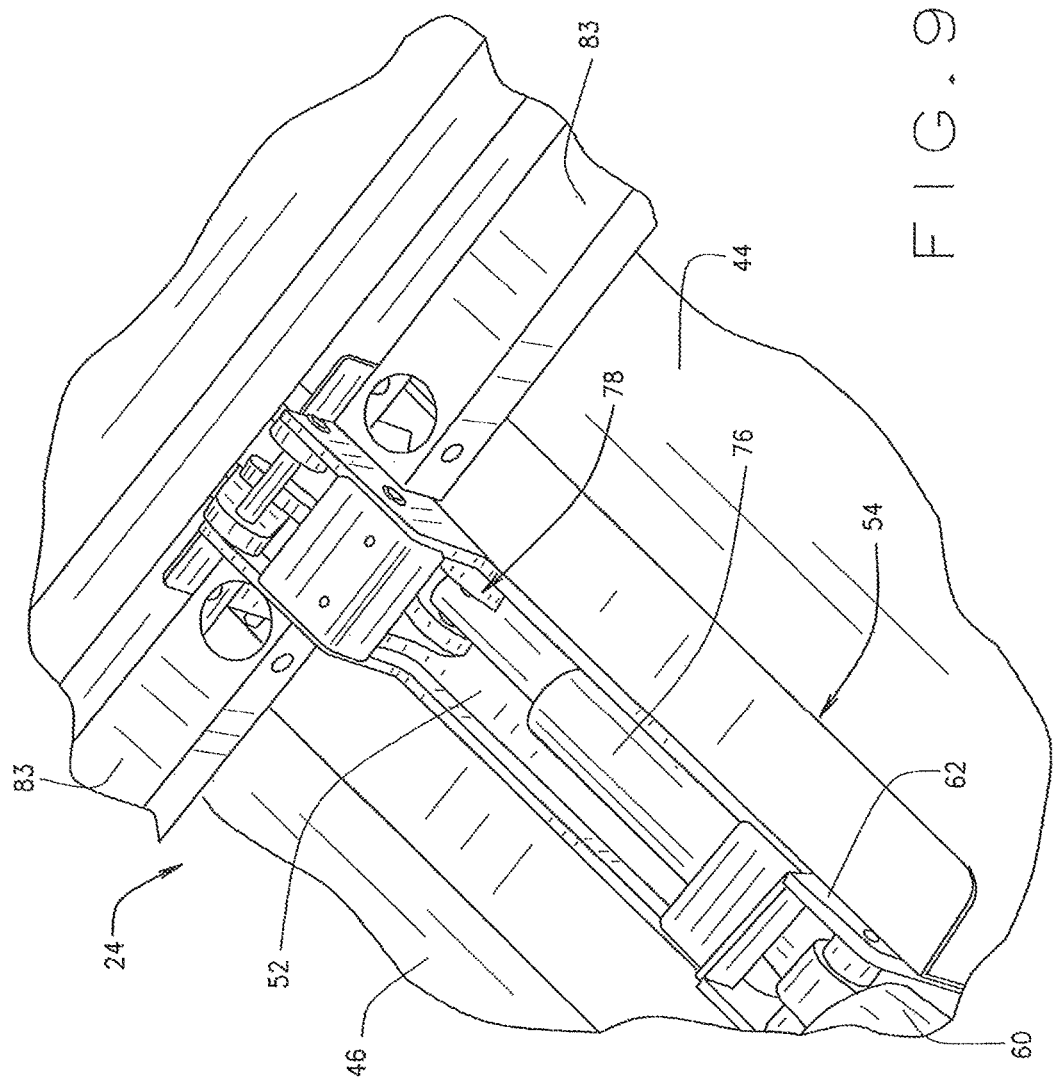
FIG. 9 is a partial perspective view similar to FIG. 8 showing the tailgate hydraulic cylinder positioned within the trough formed by the upper wedge shaped member.

FIG. 9 shows the respective cylinders 60 and 76 positioned within the channel or trough 52 without any of the associated hydraulic lines and activation units necessary for deploying the cylinders in their operational mode. FIG. 8, on the other hand, shows all of the hydraulic lines such as hydraulic lines 79 and 81 as well as control box unit 80 necessary for operating both the packing cylinder 60 as well as the tailgate cylinder 76 (FIGS. 14-16) which lies underneath control box 80. As is clearly shown in FIG. 8, all of the hydraulic lines 79 and 81 as well as control box unit 80 for operating cylinders 60 and 76 are fully contained within the trough or channel 52 associated with wedge shaped member 48 or the hollow structural members 83 and 85 (shown in a partial cut-away view) such that if any leakage of hydraulic fluid or other hazardous material from such cylinders or from such hydraulic lines occurs, all such leakage will be contained within channel or trough 52, or within structural members 83 and 85. In this regard, structural members 83 and 85 may also include any number of access openings or access plates for providing easy access to hydraulic line 81 for repair, maintenance and/or replacement. Still further, hydraulic lines other than hydraulic line 81 may also be routed through other hollow structural members associated with the present vehicle body 20 so as to further contain those lines in the event of leakage or rupture. This provides a further hazmat containment system since any fluid leakage will be trapped and collected within the hollow structural member. These hazmat containment arrangements prevent any hazardous fluid material from being directly exposed to the environment.

Figure 10:
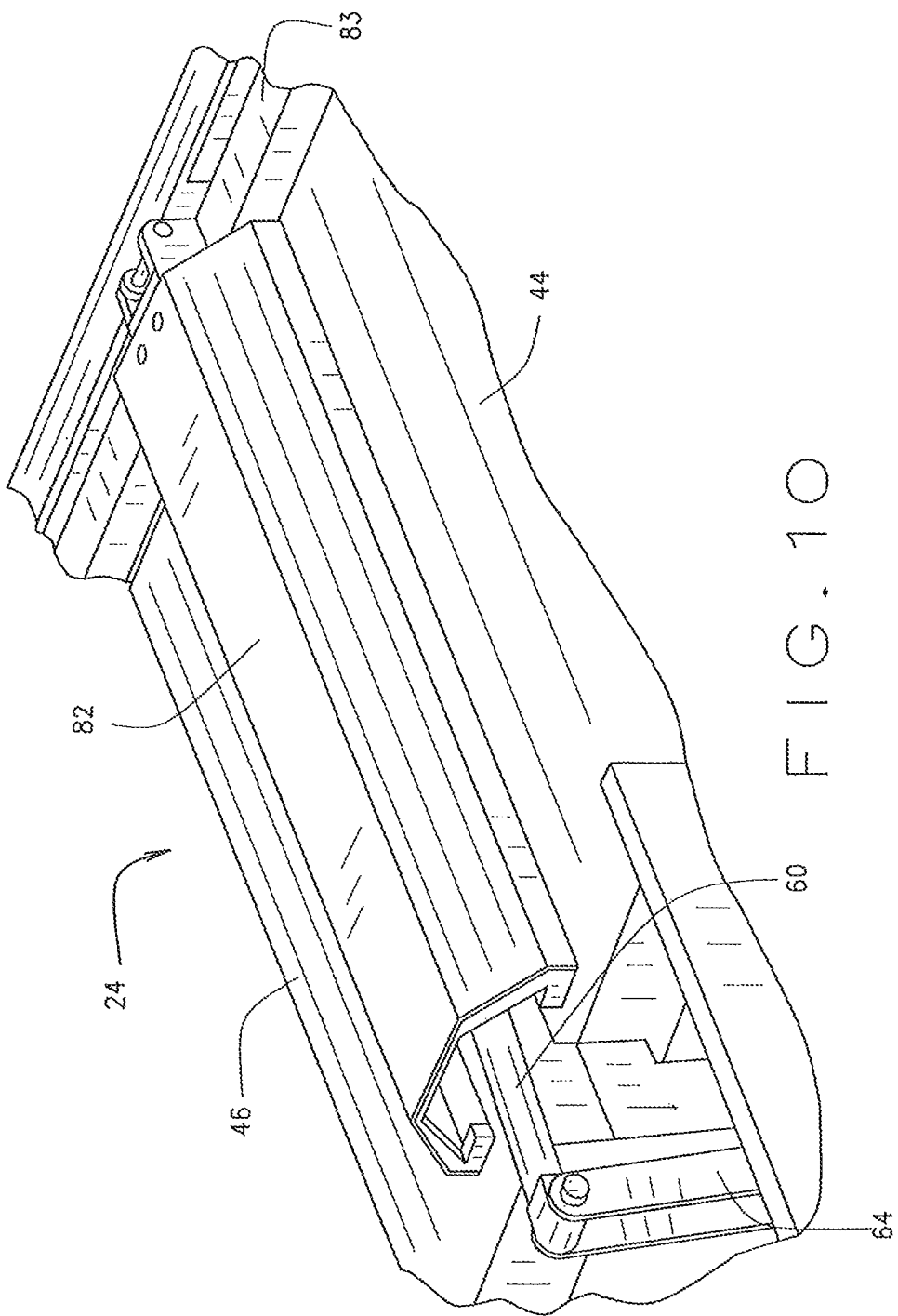
FIG. 10 is a partial perspective view similar to FIGS. 8 and 9 showing a cover plate positioned over the trough formed by the upper wedge shaped member.

FIG. 10 is a perspective view of a portion of the top of storage compartment 24 showing a cover member 82 which is positioned over the trough or channel 52, the cylinders 60 and 76, and all of the associated hydraulic lines 79 and control box unit 80 so as to protect the same during normal operation of the refuse collection vehicle 10. Cover 82 can be attached to the top portion of storage compartment 24 in any conventional manner and is easily removed so as to provide access to the components housed within the trough 52 of wedge shaped member 48.

Figure 11:
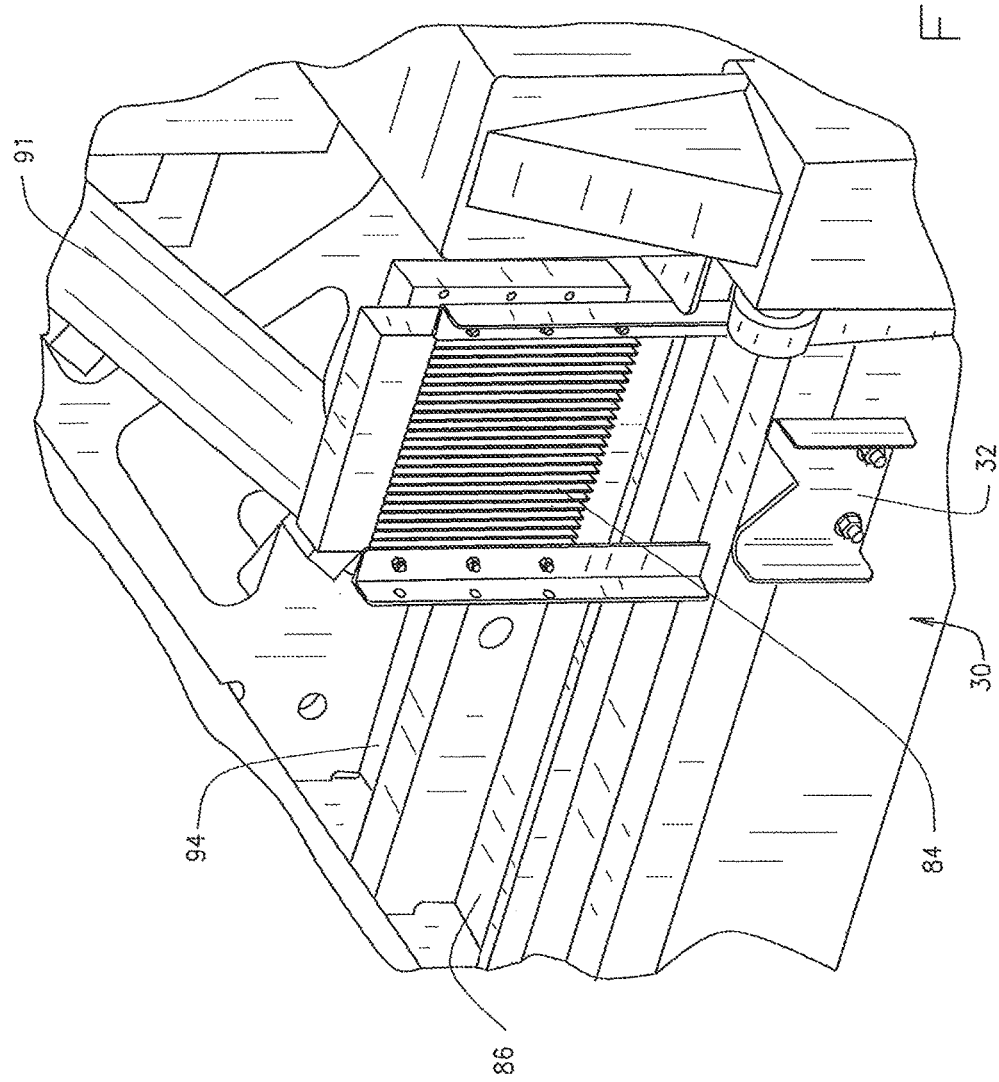
FIG. 11 is a partial perspective view showing the hydraulic fluid cooler and a portion of the vehicle body lift cylinder and their respective drip pans constructed according to the teachings of the present invention.

FIG. 11 is a partial perspective view of the accessory components 28 (FIGS. 1 and 2) associated with the present refuse collection vehicle body 20 showing a hydraulic fluid cooler 84 mounted to the subframe assembly 30 of the vehicle body 22. The cooler 84 is positioned and located so as to sit within or over a cooler drip pan 86. Drip pan 86 is self-contained such that if any fluid leakage occurs from hydraulic fluid cooler 84, all such leakage will be contained within drip pan 86.

Figure 12:
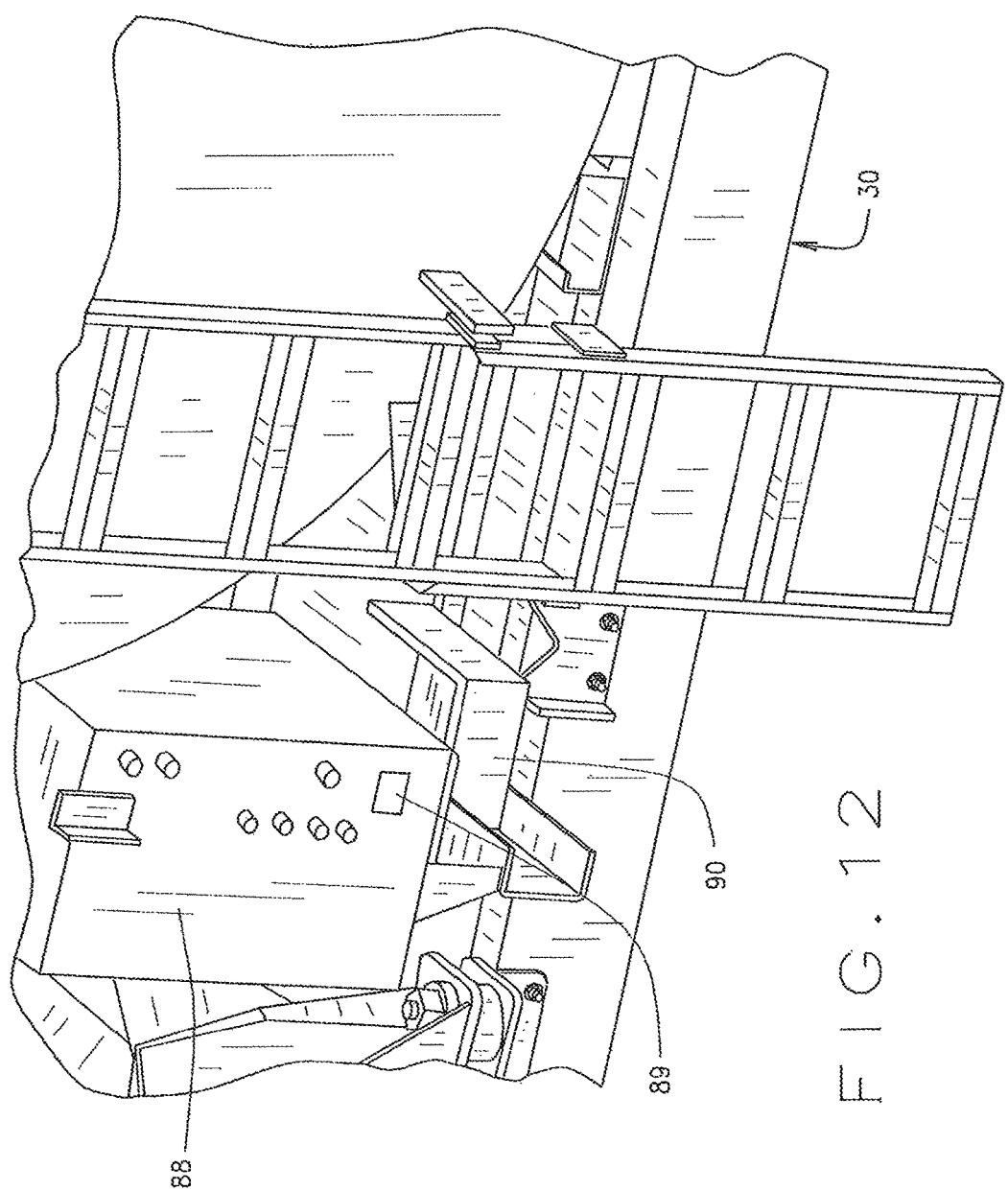
FIG. 12 is a partial perspective view of the hydraulic tank and its associated drip pan constructed in accordance with the teaching of the present invention.

In similar fashion, FIG. 12 is a partial perspective view of still another accessory component, namely, hydraulic tank 88, associated with the present refuse collection vehicle body 20. Here again, hydraulic tank 88 is mounted on subframe assembly 30 and is positioned and located within or above drip pan 90 such that if any leakage from hydraulic tank 88 occurs, all such leakage of hydraulic fluid will be contained within drip pan 90. As with fluid cooler 84 and drip pan 86, any leakage associated with hydraulic tank 88 will be captured and contained within drip pan 90 and will not be exposed to the environment.

In addition, the present hydraulic tank 88 likewise includes a low level sensor 89 positioned within the tank for sensing a low fluid level within tank 88. The sensor 89 is positioned and located so as to sense a pre-determined level of fluid within tank 88 and can likewise be either hardwired via a conductive path (not shown) to a system controller 124 (FIGS. 19 and 20), or such sensor 89 can wirelessly communicate with system controller 124 for signaling when a pre-determined fluid level is reached in tank 88. In turn, system controller 124 can be connected to an in cab control panel 128 (FIGS. 19, 22 and 23) to turn on a warning light associated with the control panel 128, and/or display a message on a screen associated with the control panel 128 thereby communicating to the operator that the hydraulic fluid level in hydraulic tank 88 is low. In addition, it is also recognized and anticipated that the system controller 124 can likewise turn off the hydraulic fluid pump (not shown) when the hydraulic fluid level in tank 88 reaches either a first pre-determined fluid level which activates the warning/message display to the operator, or when the hydraulic fluid level in tank 88 reaches a second pre-determined fluid level below the first pre-determined fluid level. Other sensor arrangements and activation systems are likewise anticipated and envisioned.

Still further, according to another aspect of the present invention, a single vehicle body lift cylinder 91 is centrally located forward of the receiving hopper 22 as best illustrated in FIGS. 1, 2 and 11 for raising and lowering the entire vehicle body 20 and for tilting the same to empty the refuse material contained within storage compartment 24. The hydraulic cylinder 91 has one end portion attached to the subframe assembly 30 as best illustrated in FIG. 11 and has its opposite end portion attached to flange member 92 associated with the outside portion of receiving hopper 22 as best illustrated in FIG. 2. Extending cylinder 91 causes the entire refuse collection vehicle body 20 to pivotally rotate from its first substantially horizontal position as illustrated in FIGS. 1 and 2 to its dumping position (not shown) so that the refuse material collected within storage compartment 24 can be egressed from compartment 24 by gravity. Cylinder 91 will pivotally rotate storage compartment 24 to a predetermined elevated position suitable for gravity feeding the refuse material stored therewithin to a position outside of storage compartment 24. This vehicle body tiling mechanism operates in a conventional manner similar to other conventional refuse collection ejection systems known in the industry. Importantly, however, the present ejection system uses a single vehicle body left cylinder as compared to the conventional usage of two or more such lift cylinders thereby not only reducing the total number of hydraulic cylinders associated with the present refuse collection vehicle body 20, which in turn reduces possible hazmat exposure, but also making the overall system less complicated, more efficient and more economical.

Also, importantly, the lift cylinder 91 likewise is positioned and located over drip pan 94 as best illustrated in FIG. 11. Here again, any fluid leakage from cylinder 91 will be captured and contained within drip pan 94 thereby preventing any hazardous fluid leakage from being exposed to the environment. Also, importantly, since the storage compartment 24 is tapered or flared as previously explained, refuse material contained within compartment 24 will more easily flow under gravity during a dumping operation since the storage compartment 24 is wider at its exit point adjacent tailgate frame structure 56 as compared to its opposite end portion. As a result, refuse material will continuously flow into a larger area of compartment 24 during the dumping operation.

Figure 17:
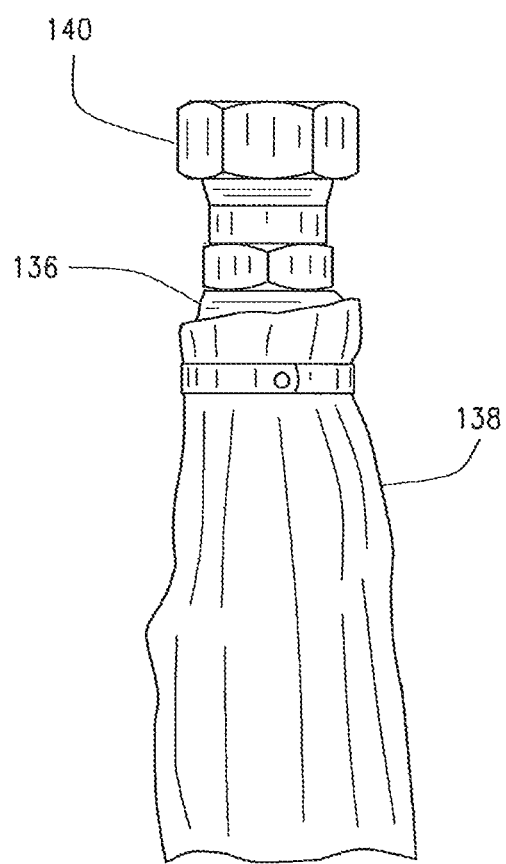
FIG. 17 is a partial perspective view showing a hydraulic line and its associated end fitting covered with a typical hose sleeve.

Still further, those hydraulic lines which cannot be positioned and located within or above a trough, drip pan, or within a hollow structural member associated with the present vehicle body, or any additional exposed hydraulic lines, such as hydraulic line 136 illustrated in FIG. 17, can be covered and/or encased within an impermeable sock or hose sleeve such as hose sleeve 138. The sleeve 138 is installed over the hydraulic line 136 and is secured at its end fitting 140 in a conventional manner. The opposite end of hose sleeve 138 is likewise secured in the same manner, or in another conventional manner, as illustrated in FIG. 17 adjacent its opposite end fitting (not shown). Should a hydraulic line develop a leak with the sleeve 138 in place as just explained, any such fluid leak will be contained within the sock or sleeve 138. The sleeve 138 likewise prevents corrosion of the hydraulic line during normal operation of the refuse collection vehicle. Since the sleeve 138 is made of an impermeable material, any such leakage will remain within the sock or sleeve 138 and will not contaminate the environment. The sleeve 138 provides still another hazmat containment system on the present refuse collection vehicle body 20 for hydraulic lines and hoses that are not otherwise contained within the present vehicle body.

As can be readily seen from the above disclosure, all of the hydraulic cylinders associated with the present refuse collection vehicle body 20 including the pendulum packing hydraulic cylinder 60, the tailgate hydraulic cylinder 76, the vehicle body lift/tilting refuse ejection hydraulic cylinder 91 as well as the hydraulic cooler 84 and the hydraulic tank 88 and their associated hydraulic lines are either located in a trough or channel such as trough 52 associated with wedge shaped member 48 or are positioned within or above a drip pan such as drip pans 86, 90 and 94 so as to fully contain any leakage from any of these cylinders, tanks, coolers or other components housing hydraulic fluid or other hazardous materials. Other hydraulic lines are housed within hollow structural members associated with the present vehicle body 20 such as structured members 83 and 85 (FIG. 8), or they are encased or covered with an impermeable hose sleeve such and hose sleeve 138 (FIG. 17). These hazmat containment devices are strategically located such that if any leakage occurs from any of these various components, all such leakage will be contained within the associated drip pans 86, 90 and 94, trough 52, structural members 83 or 85, or hose sleeves 138 and all such hazardous fluid material will remain within the present refuse collection vehicle body 20 and will not be directly exposed to the environment.

According to another aspect of the present invention, FIGS. 14-16 illustrate, in detail, the linkage assembly 78 associated with the tailgate hydraulic cylinder 76 and the tailgate assembly 26. For a tip-to-dump operation for tilting the storage compartment 24 via the lift cylinder 91 for emptying the refuse material contained within the storage compartment, it is necessary to swing or pivot the tailgate assembly 26 at least 135° to its fully opened position so that when the vehicle body 20 is in its raised position, the tailgate assembly 26 will clear the pile of unloaded refuse material as the refuse collection vehicle 10 pulls forward. This is typically done in a conventional refuse collection vehicle with at least two hydraulic cylinders located adjacent to or within the storage compartment. In the present embodiment, the present invention utilizes a single tailgate hydraulic cylinder 76 located in the trough 52 above the storage compartment 24 for accomplishing this task. This can be done with a single cylinder connected directly to the tailgate assembly without any linkage members positioned therebetween, but to do so the geometry involved requires the cylinder to be fairly long. Trying to accommodate a directly connected tailgate lift cylinder 76 within the trough or channel 52 in this matter would require the trough 52 to be much deeper than desired thereby extending into the storage space within the storage compartment 24, or it would have added to the overall height of the vehicle body 20. By using the linkage assembly 78, the hydraulic cylinder 76 can be much shorter in length and it can be easily housed within the trough or channel 52 without intruding into the load space of storage compartment 24, or adding to the overall height of the vehicle body 20.

The linkage assembly 78 includes at least one set of linkage members 142 and 144 pivotally attached to the actuating arm 146 of hydraulic cylinder 76 at pivot point 148 as best illustrated in FIGS. 14-16. As best illustrated in FIG. 14, the tailgate assembly 26 is in its fully closed position and the respective linkage members 142 and 144 are each respectively pivotally attached at their respective opposite end portions to pivot points 150 and 152. In addition, the opposite end portion of linkage member 144 is likewise pivotally connected to linkage member 154 which is likewise pivotally connected to member 156 at pivot point 158. As the actuating member 146 of hydraulic cylinder 76 is extended as illustrated in FIG. 15, linkage members 142, 144 and 154 pivot around their respective pivot points 148, 150, 152 and 158 wherein the tailgate assembly 26 is pivoted to a partially open position and has been rotated approximately 90°. Further extension of actuating arm 146 of cylinder 76 continues to rotate the linkage members 142, 144 and 154 about their respective pivot points until the tailgate assembly 26 reaches its fully opened position which is located at a position of at least about 135° of swing or rotation relative to its fully closed position illustrated in FIG. 14. Retraction of the actuating arm 146 of hydraulic cylinder 76 will move linkage member 142, 144, 154 and 156 in an opposite direction so as to fully close tailgate assembly 26.

The linkage members 142 and 144 are arcuate in shape whereas linkage member 154 is substantially straight and linkage member 156 is L-shaped in configuration. It is the combination of the pivotal attachment of arcuate members 142 and 144 with straight member 154 and L-shaped member 156 as illustrated in FIGS. 14 and 16 which produce the necessary rotation of tailgate assembly 26 so as to achieve its fully opened position with a swing of at least about 135° while still keeping the actuating arm 146 of hydraulic cylinder 76 within reason and at a shorter length so that it can be packaged and housed within trough 52 as previously explained.

In a preferred embodiment as best illustrated in FIGS. 8, 9 and 13, two sets of linkage assemblies 78 can be utilized to move the tailgate assembly 26 between its fully closed position as illustrated in FIG. 14 and its fully opened position as illustrated in FIGS. 13 and 16. In this embodiment, the actuating arm 146 of hydraulic cylinder 76 can be attached to one of the linkage assemblies 78 with corresponding connection members to the other set of linkage assembly 78, or the actuating arm 146 can be attached to a connecting member (not shown) which engages the respective pivot points 148 for moving the tailgate assembly 26 between its fully closed and fully opened positions. Other arrangements for attaching the hydraulic cylinder 76 to the linkage assemblies 78 can likewise be utilized and are envisioned.

Figure 18:
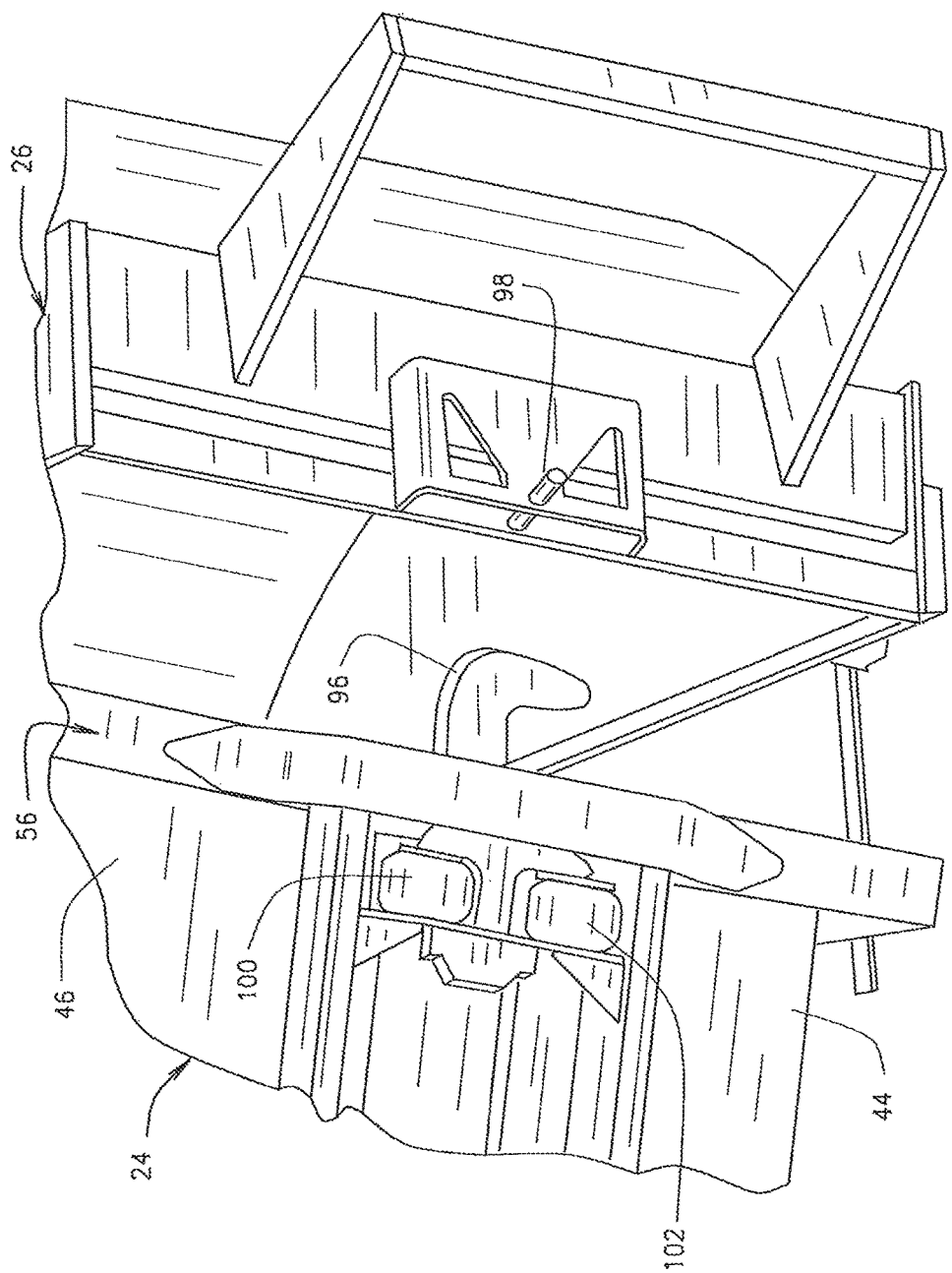
FIG. 18 is a partial perspective view showing one embodiment of a tailgate locking mechanism illustrating the tailgate latch hook member and its associated air bags as well as the latch pin member constructed in accordance with the teachings of the present invention.
Figure 19:
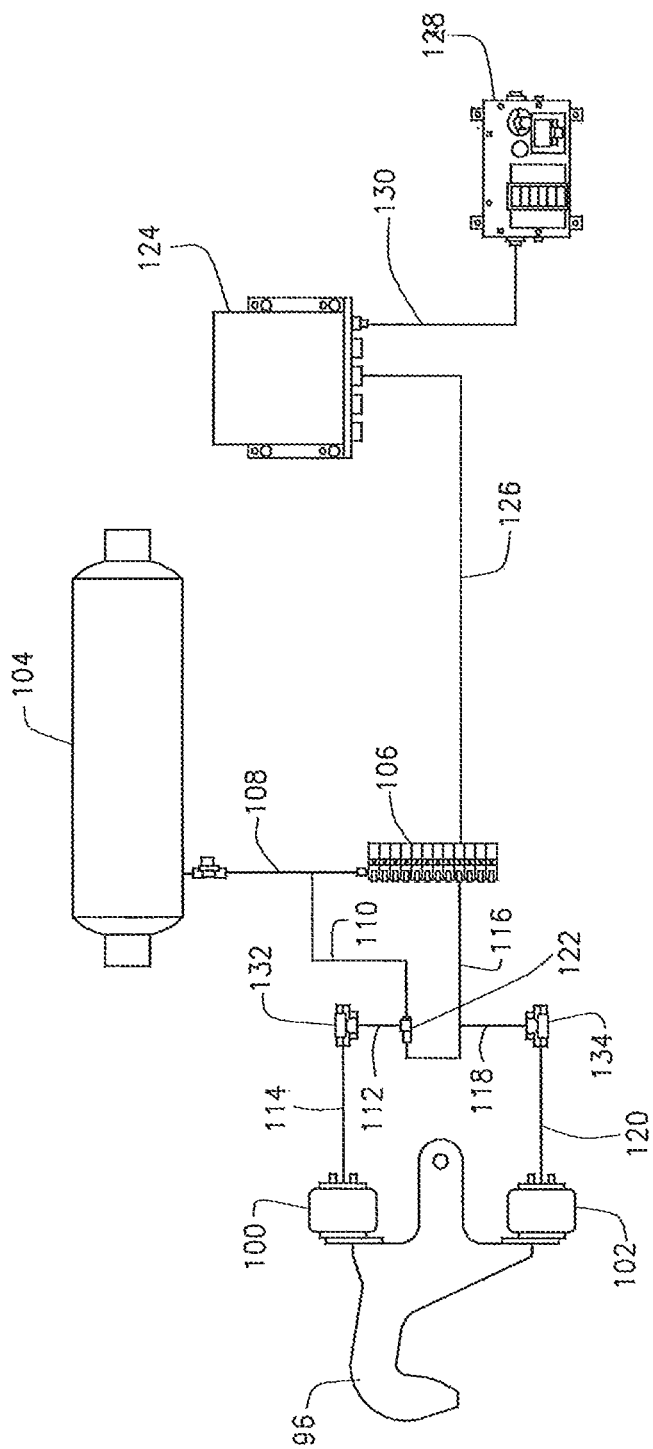
FIG. 19 is a schematic diagram showing the operation of the air lock mechanism for latching and unlatching the tailgate hook member and its associated components illustrated in FIG. 18.

According to another aspect of the present invention, one embodiment of an improved air lock latch mechanism is associated with the tailgate assembly 26 to prevent any accidental spillage of the refuse material housed within storage compartment 24. The operation of this air lock mechanism is best illustrated in FIGS. 18 and 19 and includes a pin and hook arrangement wherein a tailgate latch hook member 96 engages pin member 98 when the tailgate assembly 26 is in its closed position. A pair of pneumatic airbags 100 and 102 are positioned and located so as to control air pressure to the tailgate latch hook member 96 for moving hook member 96 into and out of engagement with pin member 98.

Operation of the air lock system of FIG. 18 is best described with reference to FIG. 19.

Air from a chassis air tank 104 is used to operate the tailgate latch mechanism. Air tank 104 can be incorporated into the refuse collection vehicle body 20 at any convenient location and is operatively connected to both a solenoid operated air valve 106 via air line 108 and to the latch close air bag 100 via air lines 110, 112 and 114. In similar fashion, solenoid operated air valve 106 is operatively connected to both the latch open air bag 102 via air lines 116, 118 and 120 and to a pilot operated valve 122 via air line 116. The solenoid operated valve 106 is also operatively connected to a system controller 124 via conductive path 126 and the system controller 124 is operatively connected to a control panel 128 located in the vehicle cab 18 via conductive pathway 130. System controller 124 can likewise be located in any convenient location, preferably within the vehicle cab 18. In its normal state, the tailgate assembly 26 is closed and latched and air pressure from air tank 104 is maintained in the latch close airbag 100 via air lines 108, 110, 112 and 114, thereby holding the tailgate hook member 96 in its latched position engaged with pin member 98. When the vehicle operator wants to unload the refuse material in storage compartment 24, the operator activates a switch associated with control panel 128 which sends a signal via conductive path 130 to system controller 124 to vent the air pressure from latch close airbag 100 via exhaust valve 132 which is located between the latch close airbag 100 and pilot operated air valve 122 and to direct air from air tank 104 to the latch open airbag 102 thereby moving hook member 96 from its latched position to an unlatched position away from pin member 98. This is accomplished by system controller 124 sending a signal to the solenoid operated air valve 122 to accomplish these tasks. This is accomplished by sending air from air tank 104 through the solenoid operate air valve 106 to pilot operated air valve 122. Pilot valve 122 then shoots off air from tank 104 via air line 110 and allows the exhaust valve 132 to vent air from air bag 100. At the same time, air from air line 116 passes through air lines 118 and 120 to pressurize the latch open air bag 102. After a predetermined time delay, system controller 124 will send a signal to the tailgate raise hydraulic valve (not shown) to activate hydraulic cylinder 76 to raise the tailgate assembly 26. Air pressure is then maintained at the latch open airbag 102 to keep hook member 96 in its open, unlatched position.

When the operator is ready to close tailgate assembly 26, the operator activates another switch associated with control panel 128 which sends a signal to system controller 124 via conductive path 130 to lower the tailgate assembly 26 to its closed position. System controller 124 will then send a signal to the tailgate lower hydraulic valve (not shown) to activate the tailgate hydraulic cylinder 76 to lower the tailgate assembly 26 to its closed position. When the operator releases the close tailgate switch, or after a predetermined time delay, the system controller 124 will send a signal to solenoid operated air valve 106 to vent the air pressure in the latch open airbag 102 and will likewise send a signal to the solenoid operated air valve 106 to supply air from air tank 104 to the latch close airbag 100 to move the tailgate hook member 96 into its latched position in engagement with pin member 98. This is accomplished by shutting off air via air line 116 to pilot operated valve 122 which then allows air from air tank 104 via air lines 108, 110, 112 and 114 to again supply air pressure to the latch close air bag 100. Since air via air line 116 is now terminated, the air pressure in latch open air bag 102 is allowed to vent through the quick exhaust valve 134 located between air bag 102 and the pilot operated air valve 122. Air pressure will then be maintained on hook member 96 via the latch close airbag 100 until the operator, once again, elects to open the tailgate assembly 26.

Use of the present air lock latch mechanism as disclosed in FIG. 19 likewise reduces the total number of hydraulic cylinders associated with the present refuse collection vehicle 10 since typically one or more hydraulic cylinders would be associated with the tailgate latching mechanism. In addition, use of a pneumatic system further eliminates a potential hazmat situation. It is also recognized and anticipated that other system controllers and pneumatic system arrangements can be utilized to accomplish the task of supplying and maintaining air pressure to the tailgate hook member 96 for moving the hook member 96 into and out of engagement with pin member 98.

Figure 20:
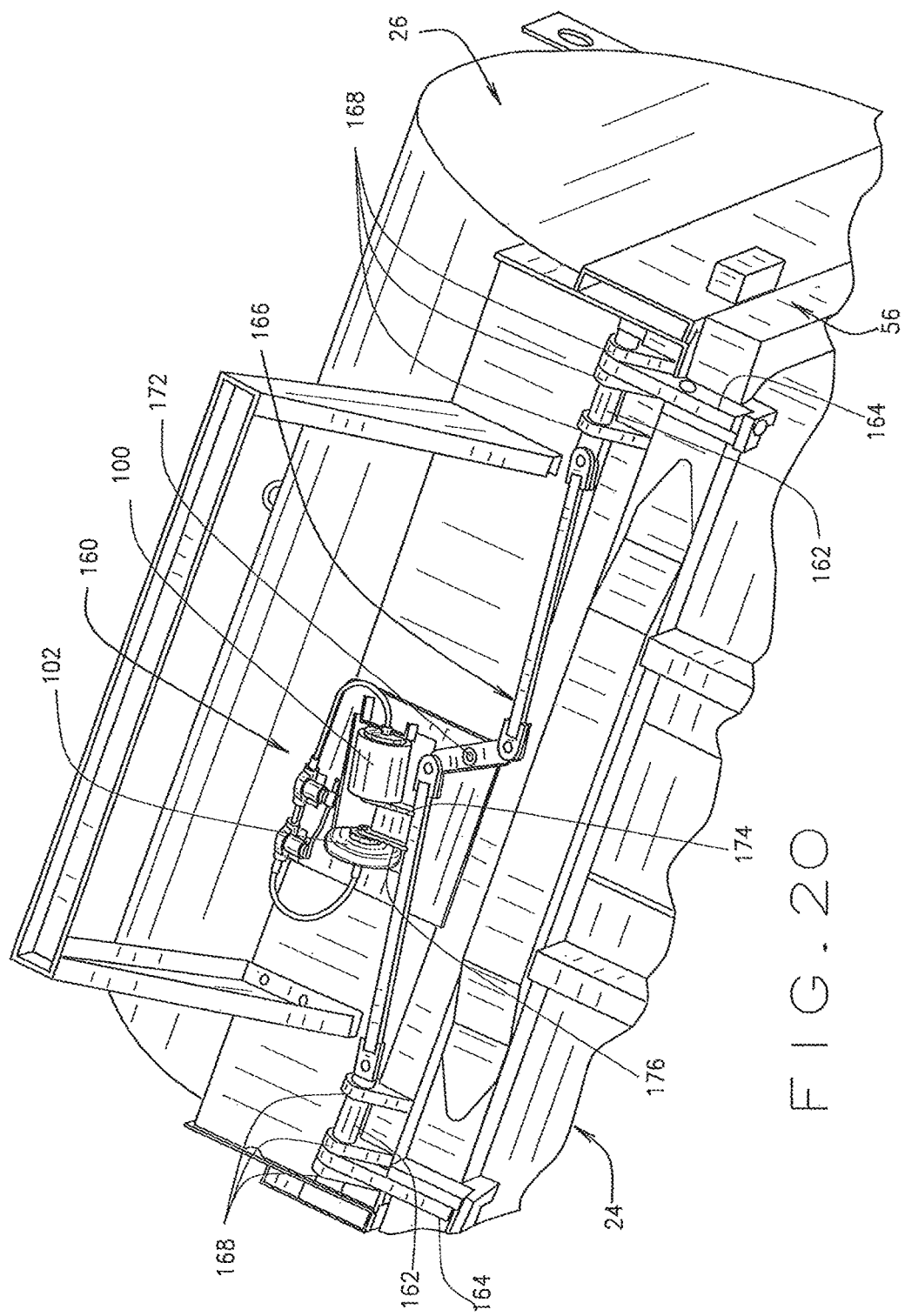
FIG. 20 is a partial perspective view showing another embodiment of a tailgate locking mechanism illustrating a pair of sliding latch pins engaged with their respective locking flange members as well as their associated air bags constructed in accordance with the teachings of the present invention.
Figure 21:
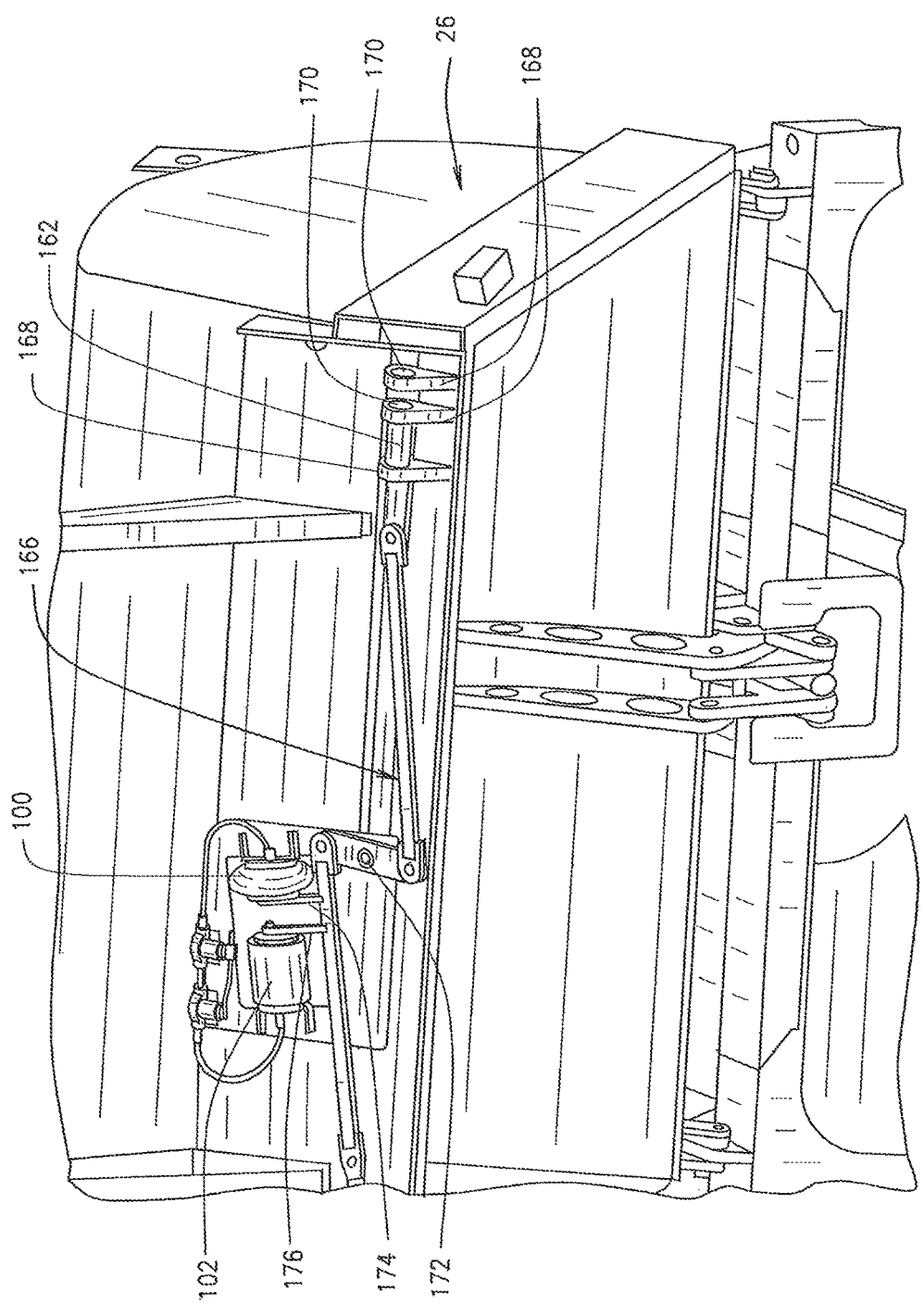
FIG. 21 is a partial perspective view similar to FIG. 20 showing the pair of sliding latch pins disengaged from their respective locking flange members.
Figure 22:
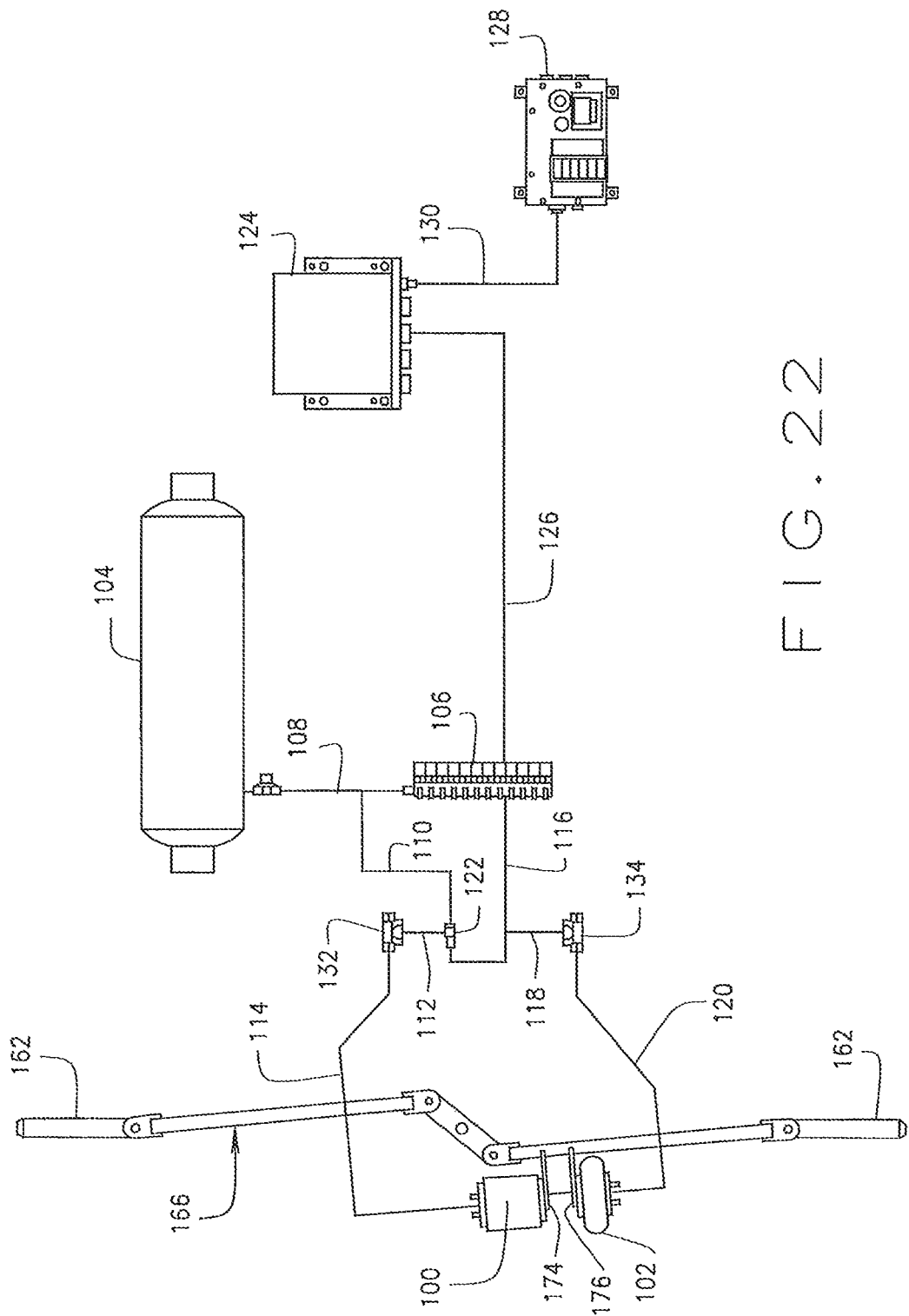
FIG. 22 is a schematic diagram showing the operation of the air lock mechanism for latching and unlatching the tailgate sliding latch pins illustrated in FIGS. 20 and 21.

According to yet another aspect of the present invention, another embodiment 160 of an improved air lock latch mechanism can likewise be associated with the tailgate assembly 26 to prevent any accidental spillage of the refuse material housed within storage compartment 24. The operation of air lock mechanism 160 is best illustrated in FIGS. 20, 21 and 22 and includes a double sliding latch pin arrangement wherein a pair of sliding latch pin members 162 engage a pair of latch locking flange members 164 when the tailgate assembly 26 is in its closed position. More particularly, the sliding latch pin members 162 are each respectively attached to one end portion of linkage assembly 166 as best illustrated in FIGS. 20-22. Linkage assembly 166 is pivotally movable by a pair of pneumatic air bags 100 and 102 which are positioned and located so as to control air pressure from air tank 104 as was previously explained with respect to the operation of the system disclosed in FIG. 19 for pivotally moving the linkage assembly 166 which, in turn, moves latch pin members 162 into and out of engagement with the latch locking flange members 164 as will be hereinafter further explained. The pair of latch locking flange members 164 are associated with the bottom portion of storage compartment 24 as best illustrated in FIG. 20 and can be attached thereto in any conventional manner such as being attached to support frame structure 56 as illustrated in FIG. 20. Each latch locking flange member 164 includes an opening or aperture (not shown) for receiving a respective latch pin member 162. In similar fashion, a plurality of flange members or bracket members 168 are associated with each opposite side of the lower portion of tailgate assembly 26 (FIGS. 20 and 21), each bracket member 168 including an opening or aperture 170 as best illustrated in FIG. 21 for receiving and holding the respective latch pin members 162. Each of the latch locking flange members 164 is positioned and located so as to be received between a pair of bracket members 168 when the tailgate assembly 26 is moved to its closed position as best illustrated in FIG. 20. When in its closed position, the openings associated with latch locking flange members 164 lie in communication and registration with the openings 170 associated with bracket members 168.

FIG. 20 shows the air lock system 160 in its closed and locked position. In this regard, when the tailgate assembly 26 is in its closed position, the pair of latch locking flange members 164 will be positioned between at least a pair of bracket members 168 such that the sliding latch pin members 162 can slide through the opening or aperture associated with each flange member 164 and through the openings 170 associated with the pair of bracket members 168 flanking each flange member 164 thereby latching the tailgate assembly 26 to the storage compartment 24. The latch pin members 162 are held in engagement with the latch locking flange members 164 via the latch close air bag 100 as will be hereinafter explained. As illustrated in FIG. 20, the latch close air bag 100 is shown in its inflated condition whereas the latch open air bag 102 is shown in its deflated condition. When air bag 100 is inflated, it pivotally moves the linkage assembly 166 about pivot point 172 such that the respective latch pin members 162 are moved outwardly o as to extend through the respective latch locking flange members 164. Air pressure from air tank 104 is maintained in the latch close air bag 100 thereby holding the latch pin members 162 in their fully extended position in engagement with latch locking flange members 164 thereby holding the pin members 162 in their latched/engaged position with flange members 164. Although FIGS. 20 and 21 illustrate the use of three bracket members 168 associated with each opposite side of tailgate assembly 26, it is recognized and anticipated that any number of flange members or bracket members 168 for holding the respective tailgate latch pin members 162 in both their latched and unlatched positions can be utilized to accomplish the latching and unlatching of pin members 162 with flange members 164.

Operation of the air lock system 160 of FIGS. 20 and 21 is likewise best illustrated with respect to FIG. 22. FIG. 22 is substantially identical to FIG. 19 and operation of the air lock system for engaging latch pin members 162 with latch locking flange members 164 is substantially identical to the operation of engaging hook member 96 with pin member 98 as illustrated and described with respect to FIGS. 18 and 19. In this regard, air from the air tank 102 is used to operate the tailgate latch mechanism 160. Air tank 104 is operatively connected to both the solenoid operated air valve 106 via air line 108 and to the latch close air bag 100 via air lines 110, 112 and 114. In similar fashion, solenoid operated air valve 106 is operatively connected to both the latch open air bag 102 via air lines 116, 118 and 120 and to a pilot operated valve 122 via air line 116. As previously explained, the solenoid operated valve 106 is also operatively connected to a system controller 124 via conductive path 126 and the system controller 124 is operatively connected to a control panel 128 located in the vehicle cab 18 via conductive patch 130.

In its normal state, the tailgate assembly is closed and latched and air pressure from air tank 104 is maintained in the latch close air bag 100 via air lines 108, 110, 112 and 114 thereby holding the latch pin members 162 in their latched position engaged with the latch locking flange members 164 as best illustrated in FIG. 20. When the vehicle operator wants to unload the refuse material in storage compartment 24, the operator activates a switch associated with control panel 128 which sends a signal via conductive path 130 to system controller 124 to vent the air pressure from latch close air bag 100 via exhaust valve 132 which is located between the latch close air bag 100 and pilot operated air valve 122 and to direct air from the air tank 104 to the latch open air bag 102 thereby pivotally moving the linkage assembly 166 about pivot point 172 so as to retract the latch pin members 162 from their corresponding latch locking flange members 164 as best illustrated in FIG. 21. This unlatching is accomplished in the same manner as previously described with respect to the air lock system of FIGS. 18 and 19. The system controller 124, the solenoid operated air valve 106, air valve 122 and pressurization of the latch open air bag 102 is accomplished in the same manner as described with respect to FIG. 19.

As illustrated in FIG. 21, when the latch open air bag 102 is inflated, the latch close air bag is deflated and the air pressure within air bag 102 pivotally moves the linkage assembly 166 in a direction so as to retract the latch pin members 162 from the latch locking flange members 164. Air pressure is then maintained at the latch open air bag 102 to keep the latch pin members 162 out of engagement with flange members 164 thereby unlatching the tailgate assembly 26. Air bags 100 and 102 are connected to linkage assembly 166 through the use of flange members 174 and 176 as best illustrated in FIGS. 20-22. Linkage assembly 166 is a conventional rocker arm mechanism.

When the operator is ready to close the tailgate assembly 26, the operator activates another switch associated with control panel 128 which again sends a signal to system controller 124 via conductive path 130 to lower the tailgate assembly 26 to its closed position. Operation of the air lock system 160 to close the tailgate assembly is again substantially identical to the operation of the air lock system previously described with respect to FIGS. 18 and 19. Use of the air lock latch mechanism 160 as disclosed in FIG. 22 likewise reduces the total number of hydraulic cylinders associated with the present refuse collection vehicle 10 as previously explained. It is likewise recognized and anticipated that other system controllers and pneumatic system arrangements can be utilized to accomplish the task of supplying and maintaining air pressure to the latch pin members 162 for moving pin members 162 into and out of engagement with the latch locking flange members 164. Other linkage assemblies other than linkage assembly 166 can likewise be utilized to accomplish this task. The same air valve system disclosed and described with respect to FIG. 19 is used to operate the air lock latch mechanism 160 illustrated in FIGS. 20 and 21. In addition, because the sliding latch pin members 162 are positioned outboard from the center of the tailgate assembly 26, this dual latch mechanism provides for a tighter seal between the storage compartment 24 and the tailgate assembly 26.

It is also recognized that control panel 128 and system controller 124 may likewise control the operation of the pendulum packing cylinder 60 which controls the operation of the packing device 58 as well as the hydraulic lift cylinder 91 for controlling the dumping operation of storage container 24. In addition, other systems and functions associated with the present refuse collection vehicle body 20 can likewise be controlled through control panel 128 such as raising and lowering the receiving hopper cover 40, flood lights associated with the vehicle, the electrical hydraulic line/hose monitoring system which will be hereinafter further explained, and other system operations.

It is also recognized and anticipated that the various hydraulic cylinders associated with the present refuse collection vehicle body 20 including hydraulic cylinders 60, 76 and 91 could be positioned and located differently then as discussed above and as disclosed in FIGS. 1-16 so long as the packing cylinder 60 is not located within the receiving hopper 22 and so long as all hydraulic cylinders are positioned and located in a trough or above or within a drip pan or other hazmat containment device or system. In addition, the same is likewise true with the hydraulic fluid cooler 84 and hydraulic tank 88. In addition, it is further recognized and anticipated that the operation of the present air lock mechanisms associated with the tailgate system 26 can likewise be configured differently than disclosed in FIGS. 19 and 22 so long as a pneumatic system is utilized to control the locking and unlocking of the latch mechanism.

Figure 23:
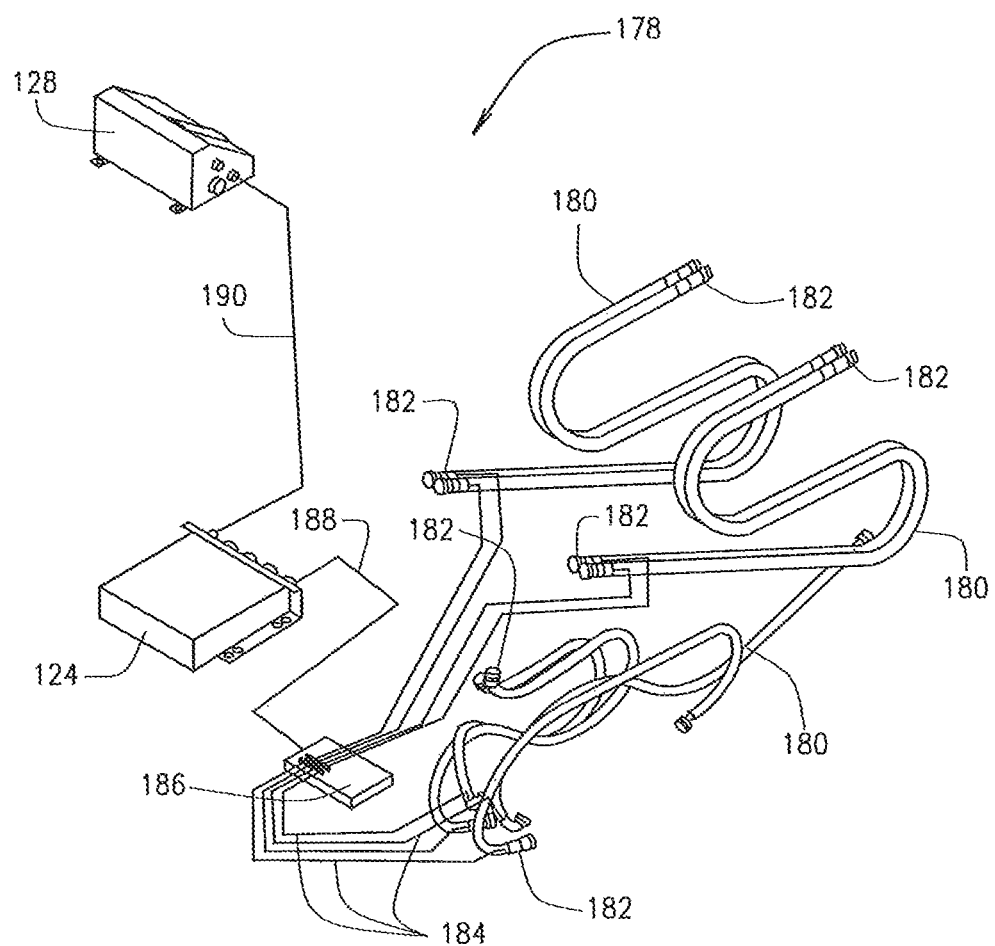
FIG. 23 is a schematic diagram showing the operation of the present electrical monitoring system associated with at least certain hydraulic lines utilized in the present vehicle for monitoring the degradation and/or pending failure of such hydraulic lines.

Still further, according to yet another aspect of the present invention. FIG. 23 illustrates a schematic diagram showing the operation of the present electrical hydraulic hose/line monitoring system 178 associated with at least certain hydraulic hoses/lines utilized in the present vehicle 10 for monitoring the degradation and/or pending failure of such hydraulic lines. More particularly, the present system 178 utilizes a monitoring system such as the Eaton LifeSense® Hydraulic Hose Monitoring System manufactured by Eaton Hydraulics Group USA of Eden Prairie, Minn. which can be coupled to the present system controller 124 and to the present in cab control panel 128 for providing advance notification to the vehicle operator when a pending failure of a particular hydraulic line is eminent. More particularly, each of the hydraulic lines/hoses 180 is specially constructed to include a built-in electronic sensing feature 182 associated with each respective hydraulic line 180 for monitoring and detecting failure-related events within a particular hydraulic line/hose such as a leak, puncture or rupture of a particular hose at a particular location, wear and tear in a particular hydraulic line, blockage at a particular location, and other such failure-related conditions within a particular hydraulic line. Each of the hose assemblies 180/182 is then connected by an electrical cable 184 to a hose monitoring unit 186. A wireless connection is also available between the electronic sensing feature 182 and the hose monitoring unit 186 when it is not practical to use an electrical cable. The hose monitoring unit 186 uses feedback from the sensors 182 associated with each hydraulic hose 180 to determine if that particular hydraulic hose is approaching failure. The hose monitoring unit 186 is then connected to the system controller 124 via conductive path 188 and the system controller is then connected to the in cab control panel 128 via conductive path 190. In the event that the hose monitoring unit 186 detects a problem with a particular hydraulic hose 180, it will signal the system controller 124 via conductive path 188. In turn, the system controller 124 will turn off the hydraulic fluid pump (not shown) associated with the present vehicle body 20 and will illuminate a warning light on the cab control panel 128. The system controller 124 will also display a message on the screen associated with the cab control panel 128 communicating to the operator that there is a hose failure.

System 178 can be associated with all hydraulic lines/hoses associated with the present vehicle body 20 but, more practically, due to costs, it can be associated with only the more critical hydraulic lines associated with the present vehicle body 20 such as the hydraulic lines extending between the pendulum packing hydraulic cylinder 60, the tailgate hydraulic cylinder 76, the vehicle body lift cylinder 91 and the hydraulic fluid cooler 84, the hydraulic tank 88 and the associated activation/control units. The present system 178 may likewise be used on those hydraulic lines/hoses which are not housed within trough 52, or positioned over a drip pan or other hazmat containment system. It is also recognized that although the present electrical hydraulic hose monitoring system 178 is tied to the present system controller 124 and the in cab control panel 128 associated with the present air lock systems illustrated in FIGS. 19 and 22, it is also recognized and anticipated that the system controller for operating the system 178 could be a separate system controller tied either to the same in cab control panel 128 or to a different control panel separate and apart from control panel 128. It is also recognized and anticipated that other hose monitoring mechanisms and other system controllers and in cab control panels can likewise be utilized to accomplish the task of monitoring and detecting failure-related events associated with any particular hydraulic line/hose used in the present refuse collection vehicle body 20.

Still further, it is also recognized that the overall dimensions of the various components associated with the present refuse collection vehicle body as well as the specific shape and configuration of the various members associated therewith are also subject to wide variations and may be sized and shaped into a wide variety of different sizes and configurations so as to be compatible with the size and shape of the overall refuse collection vehicle as well as the vehicle chassis structure onto which the present vehicle body 20 will be mounted, or to conform with any other space limitations associated therewith without impairing the teachings and practice of the present invention. Other variations and modifications to the various components comprising the present refuse collection vehicle body 20 are likewise envisioned and contemplated.

Thus, there has been shown and described an improved refuse collection vehicle body. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not "as required". Many changes, modifications, variations and other uses and applications of the present invention will, however, become apparent to those skilled in the art after considering the present specification and the accompany drawings. All such changes, modifications, variations and other uses and applications, which do not depart from the spirit and scope of the present invention, are deemed to be covered by the invention which is limited only by the claims which follow.

The invention claimed is:

1. In a refuse collection vehicle having a vehicle body, a storage compartment and a tailgate assembly, wherein the tailgate assembly is pivotally mounted to one end of the storage compartment for movement between an open position and a closed position, the improvement comprising:
   a single hydraulic cylinder positioned and located above said storage compartment for pivotally moving said tailgate assembly between its open and closed positions; and
   a linkage assembly coupled to said hydraulic cylinder and said tailgate assembly for pivotally moving said tailgate assembly through an arc of at least 135°, said linkage assembly including at least a pair of arcuate linkage members, a straight linkage member, and an L-shaped linkage member, one end portion of each of said pair of arcuate linkage members being pivotally connected to each other and being coupled to an actuating arm associated with said hydraulic cylinder, the opposite end portion of one of said arcuate linkage members being pivotally attached to the refuse collection vehicle body, the opposite end portion of the other of said pair of arcuate linkage members being pivotally attached to said straight linkage member, the opposite end portion of said straight linkage member being pivotally attached to one end portion of said L-shaped linkage member, and the opposite end portion of said L-shaped linkage member being attached to said tailgate assembly.

2. In a refuse collection vehicle having a vehicle body, a storage compartment and a tailgate assembly, wherein the tailgate assembly is pivotally mounted to one end of the storage compartment for movement between an open position and a closed position, the improvement comprising:
   a pneumatically controlled air lock mechanism associated with the tailgate assembly including a pair of sliding latch pin members and a pair of latch locking flange members, said latch pin members engaging said latch locking flange members when said tailgate assembly is in its closed position;
   a first air bag associated with said air lock mechanism for providing air pressure to said latch pin members for holding said latch pin members in an engaged position with said latch locking flange members when said tailgate assembly is in its closed position; and
   a second air bag associated with said air lock mechanism for providing air pressure to said latch pin members for disengaging said latch pin members from said latch locking flange members when said tailgate assembly is activated to move to its open position.

3. The improvement defined in claim 2 including a rocker arm linkage assembly for moving said latch pin members into and out of engagement with said latch locking flange members.

4. The improvement defined in claim 2 wherein said latch pin members are associated with said tailgate assembly and said latch locking flange members are associated with said storage compartment.

5. The improvement defined in claim 2 including at least one bracket member associated with each of said latch pin members for holding said latch pin members in a position for engaging said respective latch locking flange members.

6. In a refuse collection vehicle having a vehicle body, a storage compartment and a tailgate assembly, wherein the tailgate assembly is pivotally mounted to one end of the storage compartment for movement between an open position and a closed position, the improvement comprising:
- a pneumatically controlled air lock mechanism including a pin member and a hook member, said hook member engaging said pin member when said tailgate assembly is in its closed position;
- a first air bag associated with said air lock mechanism for providing air pressure to said hook member for holding said hook member in a latched position engaged with said pin member when said tailgate assembly is in its closed position; and
- a second air bag associated with said air lock mechanism for providing air pressure to said hook member for unlatching said hook member from said pin member when said tailgate assembly is activated to move to its open position.

\* \* \* \* \*